(12) United States Patent
Nykolak et al.

(10) Patent No.: US 11,336,371 B2
(45) Date of Patent: May 17, 2022

(54) DEFOCUSER FOR COMPACT FREE SPACE COMMUNICATION

(71) Applicant: CACI, Inc.—Federal, Arlington, VA (US)

(72) Inventors: Gerald Nykolak, Long Beach, NY (US); David C. Nielsen, Bridgewater, NJ (US); Andrew Russell Grant, Freehold, NJ (US)

(73) Assignee: CACI, INC.—FEDERAL, Reston, VA (US)

( * ) Notice: Subject to any disclaimer, the term of this patent is extended or adjusted under 35 U.S.C. 154(b) by 0 days.

(21) Appl. No.: 16/556,962

(22) Filed: Aug. 30, 2019

(65) Prior Publication Data

US 2021/0067248 A1 Mar. 4, 2021

(51) Int. Cl.
*H04B 10/00* (2013.01)
*H04B 10/112* (2013.01)
*G02B 27/09* (2006.01)
*H04B 10/118* (2013.01)

(52) U.S. Cl.
CPC ..... *H04B 10/1127* (2013.01); *G02B 27/0927* (2013.01); *H04B 10/118* (2013.01); *H04B 10/1129* (2013.01)

(58) Field of Classification Search
CPC ...... H04B 10/11; H04B 10/116; H04B 10/25; H04B 10/505; H04B 10/691; H04B 10/1123; H04B 10/118; H04B 10/40; H04B 10/503; H04B 7/18504; H04B 7/18506; H04B 7/18513; H04B 7/18515; H04B 7/18517; H04B 10/1129; H04B 3/56; H04B 10/1143; H04B 10/803; G02B 6/4246; H04Q 2011/0026
USPC ....... 398/118, 127, 128, 130, 172, 121, 129, 398/131
See application file for complete search history.

(56) References Cited

U.S. PATENT DOCUMENTS

| | | | | |
|---|---|---|---|---|
| 4,764,982 A | * | 8/1988 | Pfund | H04B 7/185 250/203.1 |
| 5,038,406 A | * | 8/1991 | Titterton | H04B 13/02 398/125 |
| 2011/0008062 A1 | * | 1/2011 | Ashdown | H04B 10/1141 398/212 |
| 2015/0069216 A1 | * | 3/2015 | Hutchin | G01J 9/02 250/201.9 |
| 2015/0070889 A1 | * | 3/2015 | Sooferian | F21V 17/06 362/232 |

* cited by examiner

*Primary Examiner* — Hibret A Woldekidan
(74) *Attorney, Agent, or Firm* — BakerHostetler; Tayan B. Patel

(57) ABSTRACT

Methods, devices, and systems are described for free space optical communication. An example device can comprise a defocuser configured to receive an optical signal from a laser and control a beam divergence of the optical signal. The optical signal can comprise a data signal and a beacon signal. The device can comprise a controller configured to cause the defocuser to adjust the beam divergence based on an operational mode of the laser.

18 Claims, 13 Drawing Sheets

DEFOCUSER FOR COMPACT FREE SPACE COMMUNICATION

BACKGROUND

Free space optical communication can include communication that uses light propagating in free space to wirelessly transmit data. Conventional devices typically rely on separate optical elements, such as apertures, lenses, and electronics to manage different phases of communication. This results in devices that are overly bulky and energy inefficient. Thus, there is a need for more sophisticated optical communication techniques.

SUMMARY

Methods, devices, and systems are disclosed for free space optical communication. An example device can comprise a defocuser configured to receive an optical signal from a laser and control a beam divergence of the optical signal. The optical signal can comprise a data signal and a beacon signal. The device can comprise a controller configured to cause the defocuser to adjust the beam divergence based on an operational mode of the laser.

An example method can comprise adjusting, based on a first operational mode, a defocuser from a first setting associated to a first setting configured for a first beam divergence. The method can comprise receiving, from a laser, a first optical signal. The method can comprise modifying, using the defocuser adjusted to the first setting, the first optical signal to have the first beam divergence. The method can comprise adjusting, based on a second operational mode, the defocuser to a second setting configured for a second beam divergence. The method can comprise receiving, from the laser, a second optical signal. The method can comprise modifying, using the defocuser adjusted to the second setting, the second optical signal to have the second beam divergence. The method can comprise outputting one or more of the modified first optical signal or the modified second optical signal.

An example system can comprise a first optical terminal and a second optical terminal configured to communicate with the first optical terminal. One or more of the first optical terminal or the second optical terminal can comprise a defocuser configured to receive an optical signal from a laser and control a beam divergence of the optical signal and a controller configured to cause the defocuser to adjust the beam divergence based on an operational mode of the laser. The optical signal can comprise a data signal and a beacon signal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

Figure 1:
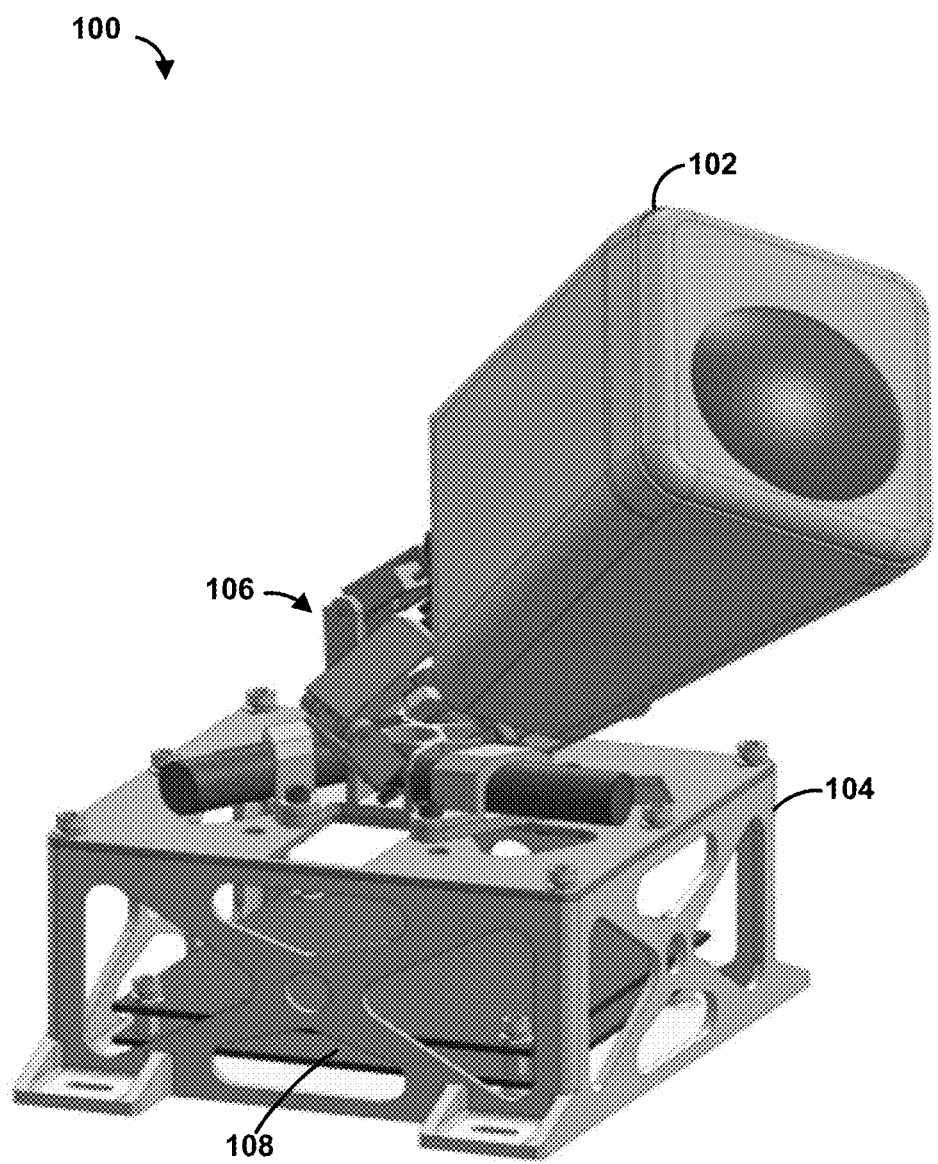
FIG. 1 shows an example device in accordance with the present disclosure.

Disclosed are devices, methods, and systems for optical communication. The disclosed devices can be optimized to minimize size, weight, and power consumption. An example device can be optimized based one or more of the following: 1) direct modulation of the laser removing the need for external optical modulators; 2) a non-amplified transmit signal to remove power inefficiencies from amplification; 3) direct rather than coherent detection of the signal to remove local oscillator and carrier recovery requirements; 4) digitization of the received signal using a variable gain limiting amplifier removing the need for a receive ADC; or 5) combining PAT (pointing, acquisition, and tracking) and data into a single optical system and a single optical source.

The disclosed device can comprise optical sources with the 800-900 nm range, but other wavelength ranges may be used. Aluminum gallium arsenide (AlGaAs) semiconductor sources can be used with wall-plug efficiencies of greater than about 30%. The device can comprise low-noise, high-gain, linear-mode Silicon APDs that provide detection with quantum efficiencies of greater than about 80%. While other sources near 980 nm provide similar wall-plug efficiencies, the longer wavelengths have reduced detection efficiency. For example, indium gallium arsenide (InGaAs) avalanche photodiodes (APDs) can provide similar detection efficiencies near 1550 nm, but have significantly higher noise, and longer wavelength sources have reduced wall-plug efficiencies near 20%. The combination of highly-efficient, high-bandwidth, single-mode sources, and low noise, high-sensitivity detectors can make the 800-900 nm range an optimal choice for the disclose device. To increase the potential transmit power and provide system redundancy, the transponder can utilize two lasers that are polarization multiplexed together. These lasers can be directly modulated to provide a NRZ-OOK signal. A receiving portion of the device can comprise a linear-mode APD that is first amplified with a transimpedance amplifier and then a limiting amplifier to directly digitize the received signal without the need for an ADC.

While pulse-position modulation (PPM) theoretically requires fewer photons-per-bit, its efficiency is only realized when the transmitter is average power limited rather than peak power limited. By using directly modulated semiconductor lasers as a transmit source, the disclosed devices can be peak power limited thus negating the benefits of PPM. While the use of other wavelengths (e.g., 1064 nm, 1550 nm), allow for the use of optical amplifiers that can provide higher peak power and realize the benefits of PPM, these other devices are limited by lower efficiency detectors and sources such that the wall-plug-efficiency remains low. Coherent detection techniques similarly promise improved energy efficiency per bit, but require significant component and processing overhead.

To provide efficient data transfer over the wide range of distances from 2000-4000 km, the disclosed device can be configured with multi-rate capabilities in the transponder and automatic selection of the best rate for a given received signal power. As an example, rates can comprise 64 Mbps, 200 Mbps, or any other appropriate rate.

An example device can comprise a lightweight, low power, free-space optical transceiver configured to provide data rates up to at least about 600 Mbps, while providing multi-rate capabilities. The link can be symmetric, operating at the full 420 Mbps rate in both directions. Depending on mission needs, the rate can be scalable to an asymmetric link with a lower total power consumption. However, a symmetric link design saves on both NRE and RE as only a single terminal type needs to be developed, and provides a lower energy per bit by efficiently utilizing the overhead required for pointing and tracking. An example mechanical model is shown in FIG. 1 showing the features of the disclosed device including a single aperture telescope, articulating joint mechanical gimbal, and compact electronics for power conditioning, control, and communications in a single lightweight housing.

The disclosed device can be based on following novel design concepts. The device can be configured to use a communications channel that uses direct detection and on-off keying with directly modulated semiconductor lasers (e.g., operating at 850/830 nm). Wavelengths can be selected to all for use of semiconductor lasers with greater than about 30% wall-plug-efficiency. High gain avalanche photo diodes (APD) can be used with quantum efficiencies of greater than about 80%. Combined with the narrow beam divergence afforded by the optical link, this produces a highly energy-efficient communications channel.

A single-aperture, multi-use telescope can be used that provides narrow-field-of-view (NFOV) tracking and comm transmit/receive, along with wide-field-of-view (WFOV) link acquisition, in a single optical assembly to reduce total system weight. This optical assembly can comprise fast Micro-Electro-Mechanical Systems (MEMS) mirrors to provide precision pointing and look-ahead capabilities required for the narrow optical transmit beam.

A pointing-and-tracking beacon can be carried on the data channel via an additional small-signal modulation. This co-use of a single laser field can reduce system power and SWaP to provide precision pointing with minimal signal overhead.

A full-hemispherical mechanical gimbal can be used to provide total hemisphere coverage. This stable and accurate gimbal can comprise articulated joints to provide continuous field-of-regard coverage without the possibility for cable wrapping and tangling associated with traditional gimbals based on rotating stages.

A controller can comprise a single FPGA. The controller can provide FEC and framing of the data payload, operate the control loops for pointing- and tracking and wide-field-of-view acquisition, and communicate with the host satellite for command and control. This single, versatile controller can reduce power consumption, simplify electronics integration, and provides an easily upgradeable solution for future needs.

A light-weight mechanical and opto-mechanical design can be used that provides not only the stability and accuracy necessary for precision optical alignment over a wide range of temperatures, but also the low mass required for launch.

Individually and in combination, these novel design features can provide an efficient and flexible inter-satellite communications link that can be utilized on a wide variety of platforms, network topologies, and satellite configurations. Additionally, use of an optical carrier, with a carrier frequency of about 3000× higher than the highest feasible RF carrier, allows for high antenna gain in a small aperture size. This configuration can reduce both system weight and atmospheric drag in low-earth orbit while providing inherent communications security as it is difficult to both jam and intercept transmitted optical signals. These system advantages can be coupled with a high level of pointing and tracking accuracy and precision. The size, weight, and power (SWaP) necessary to provide precise and accurate pointing is small compared to that required for coarse pointing over the full field-of-regard, and much smaller than the increased SWaP that would be required to provide the same communications rate with a more divergent transmit beam due to the necessary increase in transmit power. While wide-band signal processing gain could be used to reduce the required transmit power, this comes at the cost of complex signal modulation and de-modulation and increased ADC and processing requirements negating any SWaP benefits. Precise and accurate pointing does require a significant increase in system complexity and control, but technology advances in MEMS and FPGAs now make precision pointing possible in a low SWaP solution.

Non-return-to-zero, on-off-keying (NRZ-OOK) can be used for signal modulation. NRZ-OOK can provide for energy efficient modulation. NRZ-OOK allows for direct modulation of the lasers minimizing component count, and for direct digitization of the received signal using only a low-power, limiting amplifier rather than a higher-power analog-to-digital converter (ADC). It is the very simplicity of the modulation technique that makes it an ideal candidate for systems which are heavily restricted in weight and power.

Pointing, Acquisition, and Tracking (PAT) can consume as much if not more power than the communications channel. Efficient PAT can be achieved by leveraging both light-weight mechanical gimbals and MEMS mirrors to provide a pointing solution that provides a hemispherical field-of-regard with a pointing precision of less than about 9 μrad. By utilizing the same FPGA for PAT, control, and communications, additional overhead can be kept low compared to the electronics used for communications alone. This low overhead, combined with a gimbal having a strong holding torque when de-powered, allows the device to completely power down the PAT system when no link is required significantly reducing standby power and improving total system efficiency. A single laser may be used for all aspects of pointing, acquisition, and tracking. This approach is novel, unique, and greatly improves terminal SWaP.

The disclosed techniques have advantages over conventional approaches. The vast majority of currently established inter-satellite links utilize RF frequencies in the S, K, and mmW bands. However, a few test demonstrations, notably the ESA Silex demonstration have proven that optical communications with precision pointing is possible for satellite-to-satellite links. For the Silex payloads on the Spot-4 and Artemis missions, the 800 nm wavelength range was used with on-off keying, direct detection and wavelength discrimination to isolate the transmit and receive beams. Unlike the disclosed device, the Silex terminals had large 250 mm apertures, consumed 200 W of power, had masses near ~150 kg, and provided a highly asymmetric link with data transmitting in only one direction. While it should be noted that these applications were designed for Geosynchronous Equatorial Orbit (GEO) to Low-Earth Orbit (LEO) communications, the transmit laser power of 100 mW is similar to example transmit powers proposed in this disclosure. Thus, for the same laser transmit power the disclosed techniques can reduce total system power by near 50× and weight by greater than about 100 times while providing a greater field-of-regard.

Other optical-link demonstrations including the TerraSAR-X to NFIRE have demonstrated LEO-LEO communications with data rates of 5.6 Gbps. These systems however utilized a BPSK coherent communications system based on Nd-YAG lasers with Tx power greater than about 1 W. These terminals had masses of 35 kg, and a power consumption of 120 W. However, these devices rely on a coherent detection system and the inefficient laser source that causes the mass and power to be well above what is feasible for nano- and micro-satellites.

Compared to other small nano- and micro-satellite scale transmitters, the disclosed techniques are unique. These other devices typically communicate on near 437 MHz and at rates of a few kbaud. MIT Space Systems Lab has designed a free-space optical module for small satellites, but depended entirely on body pointing so that the precision pointing necessary for inter-satellite links would be difficult if not impossible. Additional research has included the possibility of including a fast-steering mirror for increased precision, but still relied on body pointing for coarse pointing of the beam. The disclosed use of a fully hemispherical steering gimbal provides a large advantage over other approaches to small inter-satellite communications and the potential missions of their host satellites.

While other, non-mechanical approaches to beam steering have been proposed, such as optical phased arrays, and liquid-crystal polarization grating switching, these have large disadvantages compared to the disclosed approach. Optical phased arrays have poor pointing efficiency as the greater than λ/2 spacing of optical elements reduces the fill fraction and puts a large portion of the power in secondary nodes rather than the central node. The liquid-crystal approach is limited by the nature of its discrete jumps as the grating is switched on and off. In current products from Boulder Nonlinear Systems, these jumps occur every 1.25° so that the signal would fade and be lost requiring reacquisition every few seconds. Furthermore, as the liquid crystal approach requires using polarized light, it would not allow for the use of polarization multiplexing to increase transmit power and provide redundancy in the transmit laser.

FIG. 1 shows an example device 100 in accordance with the present disclosure. The device 100 can be a component (e.g., terminal) of a system, such as a satellite, a network, and/or the like. The device 100 can comprise components and/or devices. The device 100 can be a communication device. The device 100 can be configured for free space optical communication, such communication to and/or from a satellite. The device 100 can comprise a terminal 102 (e.g., or scope). The device 100 can comprise a housing 104. The device 100 can comprise a coarse pointing device 106 configured to position the terminal 102 for communication. The coarse pointing device 106 may be coupled to (e.g., attached) to the housing 104. The coarse pointing device 106 can comprise a gimbal, gyroscope, and/or the like. The device 100 can comprise control electronics 108. The control electronics 108 can be disposed at least partially inside the housing 104. The control electronics 108 can comprise one or more circuit boards.

The device 100 can comprise a variety of subsystems, such as the terminal 102, the coarse pointing device 106, a data relay, Pointing, Acquisition, and Tracking (PAT) components, control electronics 108, and the housing 104. The device 100 can comprise electronics, such as one or more of the following subsystems: 1) Telescope electronics, including the steering mirror drivers, the quad detector front ends, and the front end for the data detector, 2) Data relay electronics, including the laser drivers, and interfaces to the detector front-end electronics, and 3) PAT electronics, including the interfaces to the gimbal actuators, the fast-steering mirror and the point-ahead mirror, the defocusing actuator, and PAT detector. The terminal electronics can be implemented in several small boards (e.g., disposed inside the terminal 102). The data relay electronics, the PAT electronics, power conditioning, and control can be implemented on two larger circuit boards (e.g., the control electronics 108).

Figure 2A:
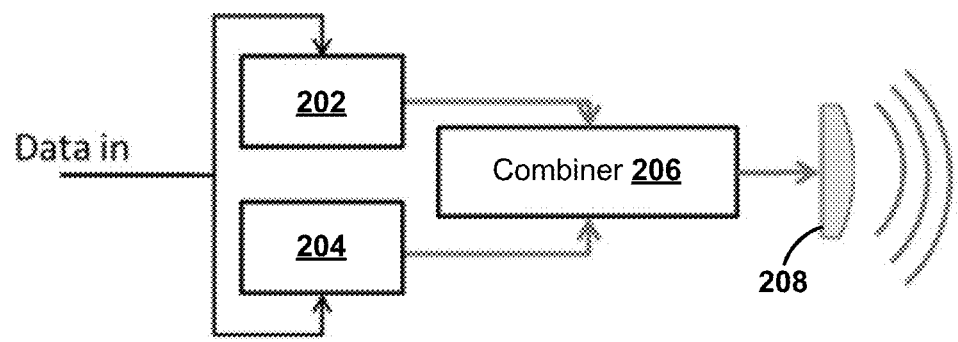
FIG. 2A is a block diagram showing a schematic of a transmit portion of an example device.

FIG. 2A is a block diagram showing a schematic of a transmit portion of an example device. The transmit portion can be implemented via one or more components disposed in the terminal 102. The transmit portion can comprise one or more lasers 202, 204. As an example, the one or more lasers can comprise an aluminum gallium arsenide (AlGaAs) laser. A data signal can be used to cause the one or more lasers 202, 204 to generate (e.g., modulate) one or more beams indicative of the data. The one or more beams can be combined using a beam combiner 206, such as a polarization beam combiner. The beam combiner 206 can output a combined beam (e.g., single beam). The combined beam can be transmitted via an optical interface 208 (e.g., lens, aperture) to free space.

Figure 2B:
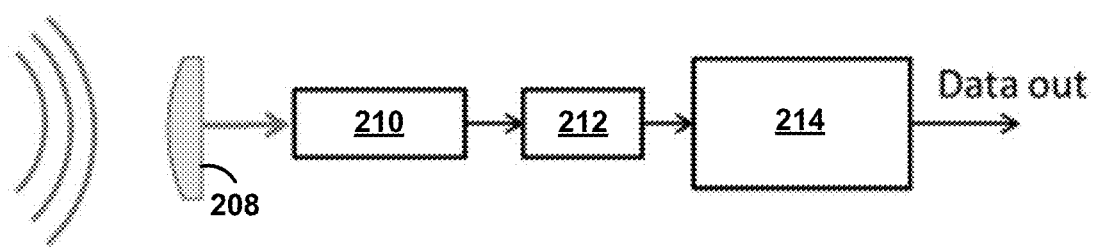
FIG. 2B is a block diagram showing a schematic of an example receive portion of an example device.

FIG. 2B is a block diagram showing a schematic of an example receive portion of an example device. The receive portion can be implemented via one or more components disposed in the terminal 102. The optical interface 208 (e.g., aperture, lens) can receive an optical signal from free space. The received optical signal can be directed (e.g., via one or more mirrors, filters) to a photodiode 210. The photodiode 210 can comprise an avalanche photodiode, such as a silicon avalanche photodiode. The photodiode 210 can be configured to convert the received optical signal into an electrical signal (e.g., current signal). The electrical signal can be supplied to a first amplifier 212. The first amplifier 212 may convert a current signal to a voltage signal, amplify the electrical signal from the photodiode 210, and/or otherwise condition the electrical signal. The first amplifier 212 can comprise a transimpedance amplifier (TIA). The output of the first amplifier 212 can be supplied to a second amplifier 214. The second amplifier 214 can convert the electrical signal received from the first amplifier 212 into a digital signal. The second amplifier 214 can be a limiting amplifier. The limiting amplifier can comprise an adjustable threshold.

Figure 3:
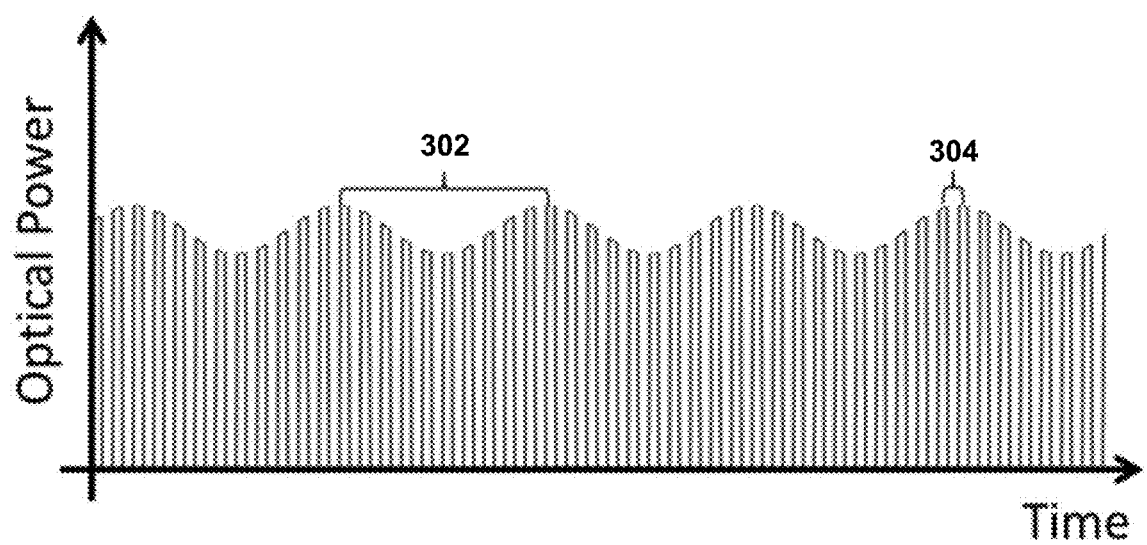
FIG. 3 is a graph illustrating an example optical signal transmission waveform.

FIG. 3 is a graph illustrating an example optical signal transmission waveform. Transmit power vs. time is shown in the graph, which illustrates a first modulation 302 and a second modulation 304 to the same optical signal. It should be understood that the relative time scale of the two modulation speeds is not necessarily shown to scale in FIG. 3 but is only used for purposes of illustration.

The first modulation 302 can have a lower frequency than the second modulation 304. The first modulation 302 can comprise a beacon signal (e.g., or a dither tone). The first modulation can have a smaller depth (e.g., modulation depth, amplitude) in comparison to the second modulation 304. The second modulation 304 can comprise a data signal. The first modulation 302 can be used for acquisition, tracking, pointing, and/or other positioning.

The first modulation 302 and the second modulation 304 can both be generated using the same laser source. The laser source can modulate the first modulation 302 and the second modulation simultaneously, as two separate channels, and/or the like. As an example, the first modulation 302 can have a frequency in the kHz range (e.g., about 5 kHz). The first modulation 302 can comprise a sine wave with a frequency in the kHz range (e.g., about 5 kHz). The second modulation 304 can have a data rate (e.g., or frequency) in the Mbps range, Gbps range, and/or the like. The second modulation 304 can comprise an NRZ data signal (e.g., having the data rate). The first modulation 302 can comprise a first modulation depth (e.g., 1 dB). The second modulation 304 can comprise a second modulation depth different than the first modulation depth.

The first modulation 302 can be synchronously detected on a position-sensitive, quadrant detector (e.g., spatial detector) to provide pointing information. The pointing information can be provided to a coarse pointing element (e.g., gimbal) and a pair of fast steering mirrors. The steering mirrors can provide precision pointing with platform jitter compensation and look-ahead capabilities to offset the receive and transmit directions. The steering mirrors can comprise Micro-Electro-Mechanical Systems (MEMS) fast steering mirrors can provide a low SWaP solution configured with 1 μrad of pointing accuracy with greater than 1 kHz open loop modulation response.

The device can comprise a single aperture telescope configured for NFOV pointing and tracking, WFOV acquisition, and simultaneous data transmit and receive. To provide simultaneous transmit and receive from the same aperture wavelength multiplexing can be used. For example, while one terminal will transmit at a first wavelength (e.g., 850 nm), the terminal can receive at a second wavelength (e.g., 830 nm). The adjacent communications terminal can transmit at second wavelength and receive at the first wavelength. Wavelength division multiplexing within the telescope, can provide transmit/receive isolation to maintain signal sensitivity. To provide both a narrow beam divergence for communications and NFOV tracking, and a WFOV beacon for acquisition, a lens translation stage (e.g., or defocuser) can be included so that the output field can be defocused to provide a larger beam divergence during initial acquisition of the adjacent terminal.

Figure 4:
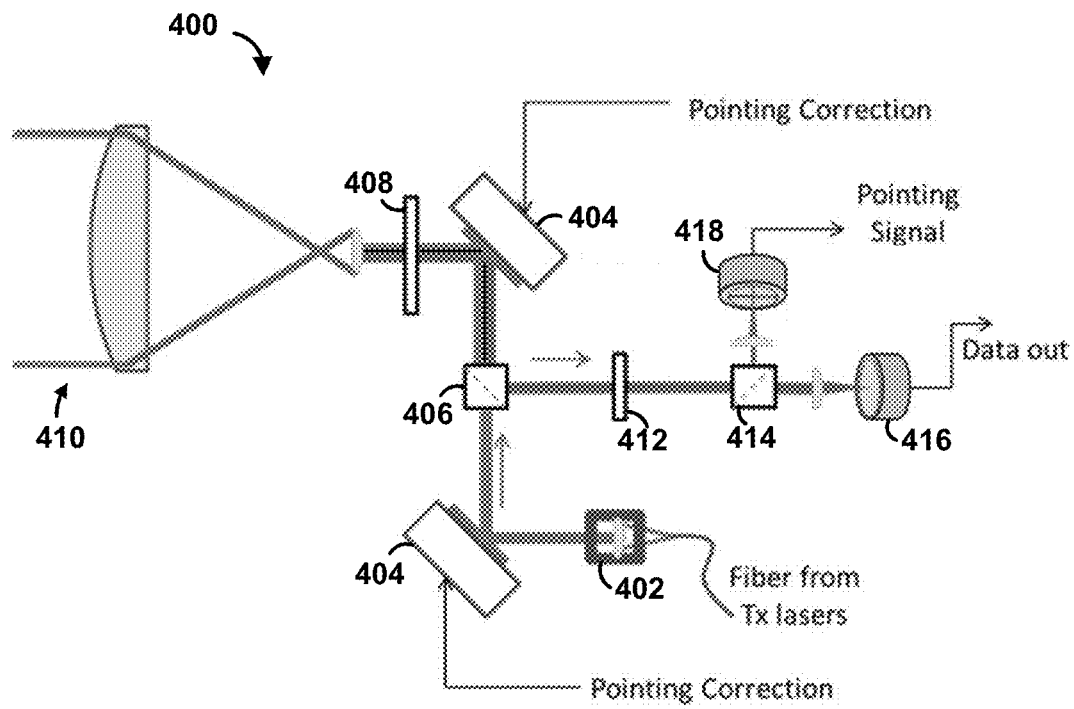
FIG. 4 is a diagram showing an example terminal in accordance with the present disclosure.

FIG. 4 is a diagram showing an example terminal (e.g., scope, telescope) in accordance with the present disclosure. The terminal 400 can comprise the terminal 102 of FIG. 1. The terminal 400 can comprise a defocuser 402. The defocuser 402 can be optically coupled (e.g., via an optical fiber) to a laser (e.g., not shown). The defocuser 402 can be configured to receive an optical signal from the laser. The defocuser 402 can be configured to control a beam divergence of the optical signal. A modulator can be configured to cause the laser to output an optical signal comprising a data signal and a beacon signal. The beacon signal can be modulated at a first frequency. The data signal can be modulated at a second frequency higher than the first frequency. The beacon signal can be modulated at a first modulation depth (e.g., amplitude). The data signal can be modulated at a second modulation depth greater than the first modulation depth. The defocuser 402 may comprise and/or be communicatively coupled to a controller configured to cause the defocuser 402 to adjust the beam divergence based on an operational mode of the laser.

The operational mode can comprise one or more of a first operational mode, a second operational mode, or a third operational mode. The first operational mode can comprise a data communication mode. The second operational mode can comprise a tracking mode (e.g., or a link acquisition mode). The third operational mode can comprise a link acquisition mode (e.g., or a tracking mode). The controller can be configured to cause the defocuser 402 to adjust the beam divergence to have a first beam divergence angle for a first operational mode. The controller can be configured to adjust the beam divergence to have a second beam divergence angle for the second operational mode. The controller can be configured to adjust the beam divergence to have a third beam divergence angle for the third operational mode. The second beam divergence angle can be larger than the first beam divergence angle. The third beam divergence angle can be larger than the first beam divergence angle and/or second beam divergence angle.

The terminal 400 can comprise one or more steering mirrors 404 (e.g., fast steering mirrors). The one or more steering mirrors 404 can be configured for adjusting pointing (e.g., of a signal for transmission or a received signal) during one or more of a tracking mode or a data communication mode. The defocuser 402 can supply an optical signal to one of the steering mirrors 404. The steering mirror 404 can supply the optical signal to a first filter 406 (e.g., transmission receive filter). The first filter 406 can supply the optical signal to a second one of the one or more steering mirrors 404. The second one of the one or more steering mirrors 404 can supply the optical signal to a second filter 408. The second filter 408 can comprise a stray light filter.

Figure 6:
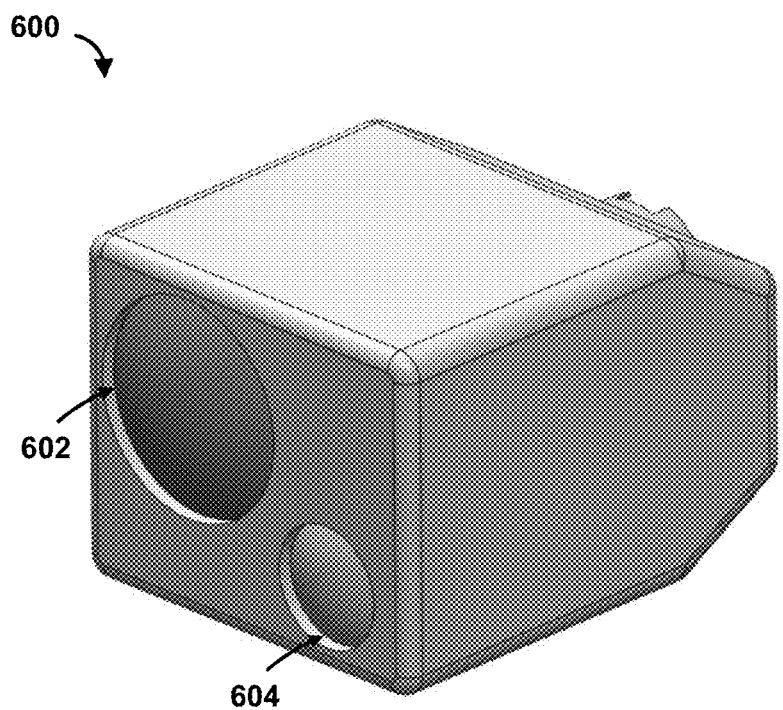
FIG. 6 shows an example terminal comprising multiple apertures.

The second filter 408 can supply the optical signal to an optical interface 410. The optical interface 410 can be configured to receive the optical signal from the defocuser 402 (e.g., or via the second filter 408). The optical interface 410 can be configured to output the optical signal into free space. The optical interface 410 can comprise one or more openings, one or more lenses, and/or the like. The optical interface 410 can comprise a first aperture (e.g., as shown in FIG. 1 and FIG. 4.). As an example, the size of the first aperture can comprise 46 mm. The optical signal can be output via the first aperture during one or more of the first operational mode, the second operational mode, or the third operational model. The optical interface can comprise a second aperture (e.g., as shown in FIG. 6). The optical signal can be output via the first aperture during a first operational mode. The optical signal can be output via the second aperture during the second operational mode and/or the third operational mode.

The optical interface 410 can be configured to receive an optical signal from free space. The optical interface 410 can be configured to supply the received optical signal to the second filter 408. The second filter 408 can be configured to supply the received optical signal to the second mirror of the one or more steering mirrors 404. The second mirror of the one or more steering mirrors 404 can be configured to supply the received optical signal to the first filter 406. The first filter 406 can be configured to reflect the received optical signal to a third filter 412. The third filter 412 can be configured to supply the received optical signal to a beam splitter 414.

The beam splitter 414 can be configured to split the received optical signal into a first signal and a second signal. The beam splitter 414 can be configured to supply the first signal to a data detector 416. The data detector 416 can be optically coupled to the beam splitter 414 (e.g., directionally oriented, aligned for optical transmission). The data detector 416 can be configured to receive the first signal. The data detector 416 can be configured to convert the first signal into a data signal (e.g., electrical data signal, digital data signal. The data detector 416 can comprise a photodiode configured to convert, based on the data signal, the first signal to an electrical signal.

The beam splitter 414 can be configured to supply the second signal to a spatial detector 418. The spatial detector 418 can be optically coupled to the beam splitter 414. The spatial detector can be configured to receive the second signal. The spatial detector can be configured to convert, based on the beacon signal, the second signal to an electrical signal for determining positioning information. The positioning information can be used to adjust one or more of a coarse pointing element (e.g., a mechanical gimbal) or the one or more steering mirrors 404.

One or more controllers can be configured to control operation of the elements of the terminal 400, such as the defocuser 402, the one or more steering mirrors 404, and/or the like. The defocuser 402 and the one or more steering mirrors 404 can be controlled by separate controllers. A master controller can control the separate controllers. The master controller can comprise a single FPGA (e.g., or other integrated circuit, such as an ASIC).

The master controller can be configured to control multiple modes of operation, such as a mode to establish the link, a mode to maintain the link, and a mode to close the link. The one or more controllers (e.g., or master controller) can control operation of communications terminals as follows. Command and control from the host satellite can signal a communications request and/or provides ephemeris data for the desired satellite node. One or more lasers can be turned on (e.g., at full power). The output (e.g., combined output) of the one or more lasers can be defocused to provide a wide-field-of-view beacon for acquisition. The one or more lasers can be modulated with a beacon tone (e.g., at substantially 100% with a ~5 kHz acquisition tone). Detector boards, a gimbal, and MEMS control boards can be powered on.

A transmitted beam with a large beam divergence can be raster scanned over the expected satellite location determined from ephemeris data. The two ends of the link can scan at different speeds to ensure each device will point at each other and establish lock in a short time (e.g., less than about 72 s). Locking can be signaled by both satellites making a small change in their beacon's respective modulation frequency. A transmit laser output can be focused (e.g., by defocuser 402) to provide a narrow diverging beam for communications and precise pointing and tracking. Both terminals can send handshake data to establish timing and the communications rate. The beacon modulation can be reduced to 1 dB, as shown in FIG. 3.

Payload data from the host satellites can be transmitted. Ephemeris data, pointing calibration data taken during acquisition, and/or positive feedback from the spatial detector(s) 418 (e.g., one or more quad photodetectors), can provide control signals to the coarse pointing element and/or one or more steering mirrors (e.g., MEMS mirrors) for continued precision pointing over the link's lifetime. Command and control from the host satellite can request the termination of the communications link. Transponder and pointing and tracking operations can be de-powered. The one or more controllers (e.g., the FPGA, the master controller) can enter a standby state to reduce power consumption until a communications link is again requested.

Figure 5:
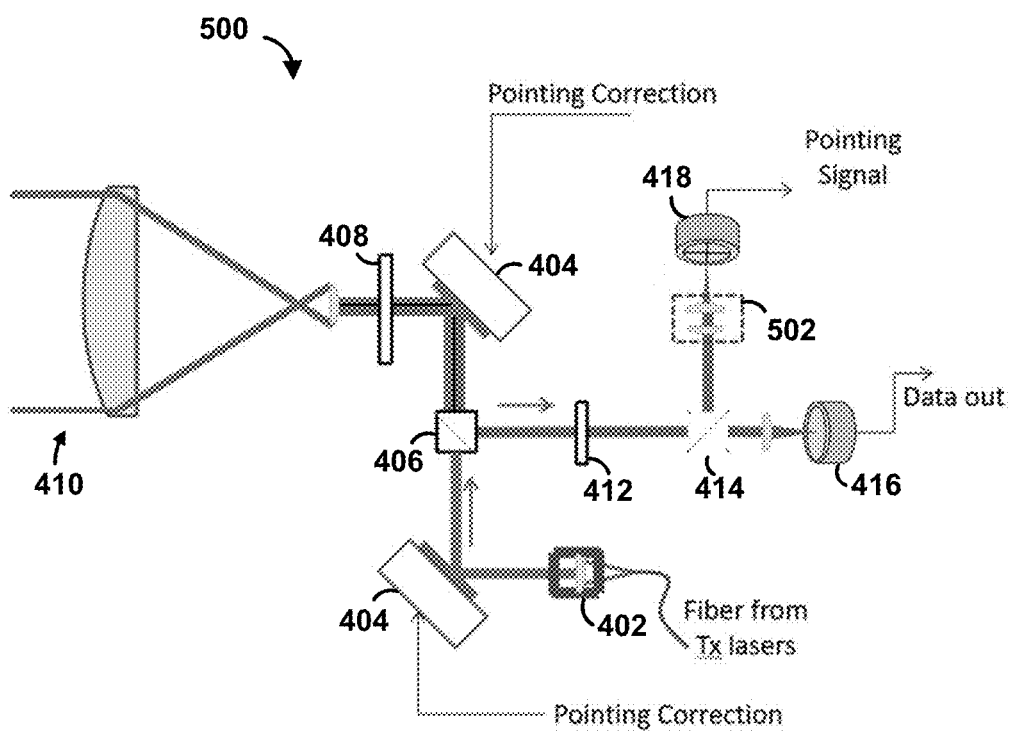
FIG. 5 is a diagram showing another example terminal in accordance with the present disclosure.

FIG. 5 is a diagram showing another example terminal 500 in accordance with the present disclosure. The terminal 500 can comprise some or all of the features of the terminal 400 of FIG. 4. The terminal 500 be configured for only using one laser and/or one aperture. Only a single spatial detector 418 can be used for the first operational mode, the second operational mode, and/or the third operational mode. The terminal 500 can comprise a zoom element 502. The zoom element 502 can be used to increase the Field of View of the terminal 502 during Acquisition, rather than having a completely separate (e.g., and fixed) Wide Field of View Aperture and associated additional optical elements.

The zoom element 502 can be optically coupled between the spatial detector 418 and the beam splitter 414. The zoom element can be configured to control one or more of a beam divergence, a focus, a field of view, and/or the like of the received optical signal (e.g., or the second signal from the splitter 414) upon the spatial detector 418. One or more controllers can be configured to cause the zoom element 502 to adjust the beam divergence (e.g., or field of view, configuration) between a first beam divergence (e.g., or a first field of view, first configuration) for a first operational mode and a second beam divergence (e.g., second field of view, second configuration) for a second operational mode. The second beam divergence can be larger (e.g., wider) than the first beam divergence. Additionally or alternatively, the first beam divergence can be wider than the second beam divergence.

The zoom element 502 can comprise a first configuration associated with the first operational mode. The zoom element 502 can comprise a second configuration associated with the second operational mode. The zoom element 502 can comprise a third configuration associated with the second operational mode. The first configuration can focus (e.g., or defocus) an optical signal having a first beam divergence upon the spatial detector (e.g., with an appropriate focus and/or beam divergence for the spatial detector). The second configuration can focus (e.g., or defocus) an optical signal having a second beam divergence upon the spatial detector (e.g., with an appropriate focus and/or beam divergence for the spatial detector). The first configuration can focus (e.g., or defocus) an optical signal having a first beam divergence upon the spatial detector (e.g., with an appropriate focus and/or beam divergence for the spatial detector).

FIG. 6 shows an example terminal 600 comprising multiple apertures. The terminal 600 can comprise a first aperture 602 and a second aperture 604. The first aperture 602 can be larger than the second aperture 604. The first aperture 602 can be used for a first operational mode, a second operational mode, a third operational mode, and/or the like. The second aperture 604 can be used for the second operational mode and/or the third operational mode. The first aperture 602 can be used for transmitting the laser signal. The first aperture 602 can be used for acquisition, tracking, data transmission, or a combination thereof. The first aperture 602 can be used for narrow field of view tracking. The second aperture 604 can be used for wide field of view acquisition.

Figure 7:
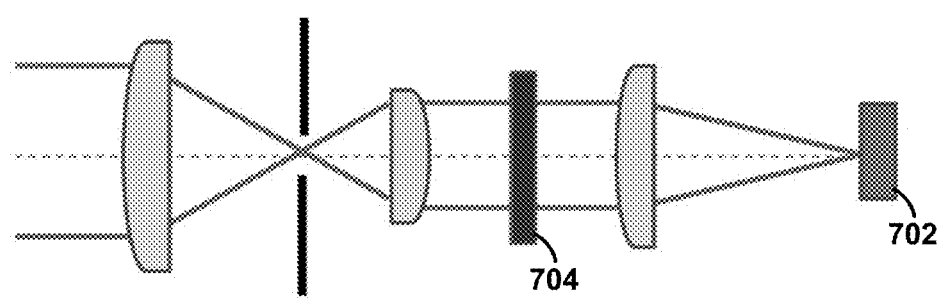
FIG. 7 shows a diagram of example optical elements for the second aperture of FIG. 6.

FIG. 7 shows a diagram of example optical elements for the second aperture of FIG. 6. The optical elements can be enclosed in the terminal 600. The optical elements can comprise an additional spatial detector 702. The terminal 600 can comprise both the spatial detector 418 described above and the additional spatial detector 702. The optical elements can be configured for supplying a wide field of view signal to the additional spatial detector 702. The optical elements can comprise a filter 704. The filter 704 can comprise an apodization filter.

Figure 8:
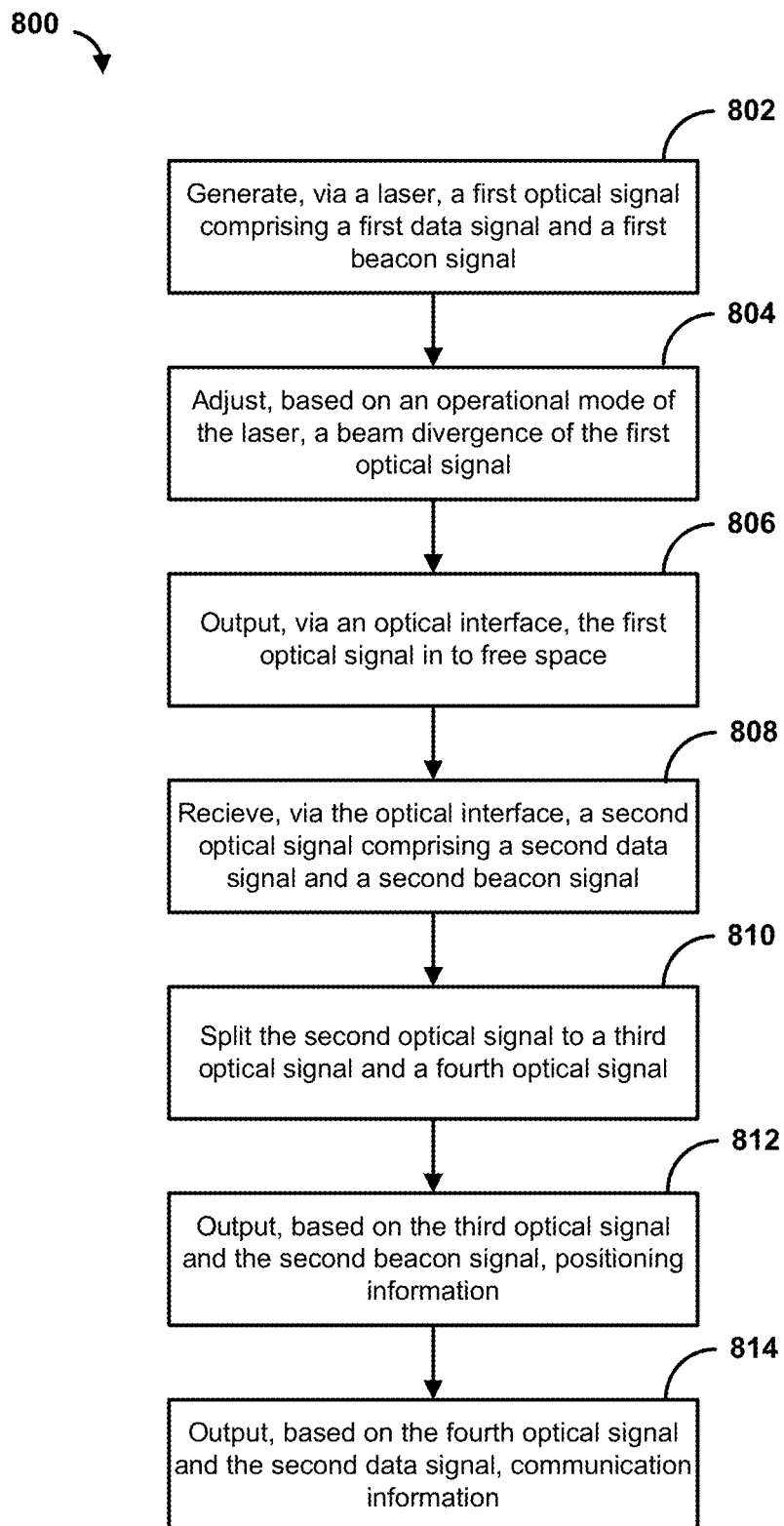
FIG. 8 is flowchart showing an example method for free space optical communication.

FIG. 8 is flowchart showing an example method 800 for free space optical communication. At step 802, a first optical signal can be generated. The first optical signal can be generated by one or more lasers. The first optical signal can comprise a first data signal and a first beacon signal. The first beacon signal can be modulated at a first frequency, and the first data signal is modulated at a second frequency higher than the first frequency.

At step 804, a beam divergence (e.g., focus, or other optical characteristic) of the first optical signal can be adjusted. The defocuser 402 of FIG. 4 can adjust the beam divergence. The beam divergence can be adjusted based on an operational mode of the laser. Adjusting the beam divergence of the first optical signal can comprise causing a defocuser to adjust the beam divergence to have one or more of a first beam divergence for a first operational mode or a second beam divergence for a second operational mode. The second beam divergence can be wider than the first beam divergence. The first operational mode can comprise a data communication mode. The second operational mode comprise one or more of a tracking mode or a link acquisition mode.

At step 806, the first optical signal can be output in to free space. The first optical signal can be output via an optical interface (e.g., via a first aperture, a lens). The first optical signal can transmit information from one device to another (e.g., from satellite to satellite, from ground to satellite, from satellite to ground, from a spacecraft to another spacecraft, from a spacecraft to a satellite, from a spacecraft to ground).

At step 808, a second optical signal can be received. The second optical signal can be received via the optical interface (e.g., via the first aperture, via a second aperture). The second optical signal can comprise a second data signal and a second beacon signal. The second beacon signal can be modulated at a first frequency. The second data signal can be modulated at a second frequency higher than the first frequency.

At step 810, the second optical signal can be split (e.g., by a beam splitter) to a third optical signal and a fourth optical signal. The second optical signal can be split by the beam splitter 414 of FIG. 4.

At step 812, positioning information can be output. The positioning information can comprise a positioning signal. The positioning information can be output by a spatial detector, such as a quad detector. The spatial detector can detect the third optical signal. The positioning information can be based on which portions of the spatial detector detect the third optical signal. The positioning information can be output based on the second beacon signal. The second beacon signal can indicate which device is transmitting the second optical signal.

A coarse pointing element can be adjusted based on the positioning information. The coarse pointing element can be configured for adjusting pointing during an acquisition mode (e.g., link acquisition mode). One or more steering mirrors can be adjusted based on the positioning information. The one or more steering mirrors can be configured for adjusting pointing during one or more of a tracking mode or a data communication mode.

At step 814, communication information can be output. The communication information can comprise data, a digital signal, an electrical signal, and/or the like. The communication information can be output based on the fourth optical signal. The fourth optical signal can be received by a data detector, such as an avalanche photodiode that converts the optical signal into an electrical signal. The electrical signal can be amplified and/or converted into a digital signal. The communication information can be based on the second data signal. The data, electrical signal, digital signal and/or the like can be indicative of the data carried in the second data signal. Outputting the communication information can comprise generating, using the photodiode, a current signal indicative of the data signal, converting the current signal to a voltage signal, and converting the voltage signal to a digital signal.

Examples and Analysis

The following description provides further examples and analysis. It should be understood that the disclosure is not limited to these examples, but the examples are provided for purposes of illustration.

Figure 9:
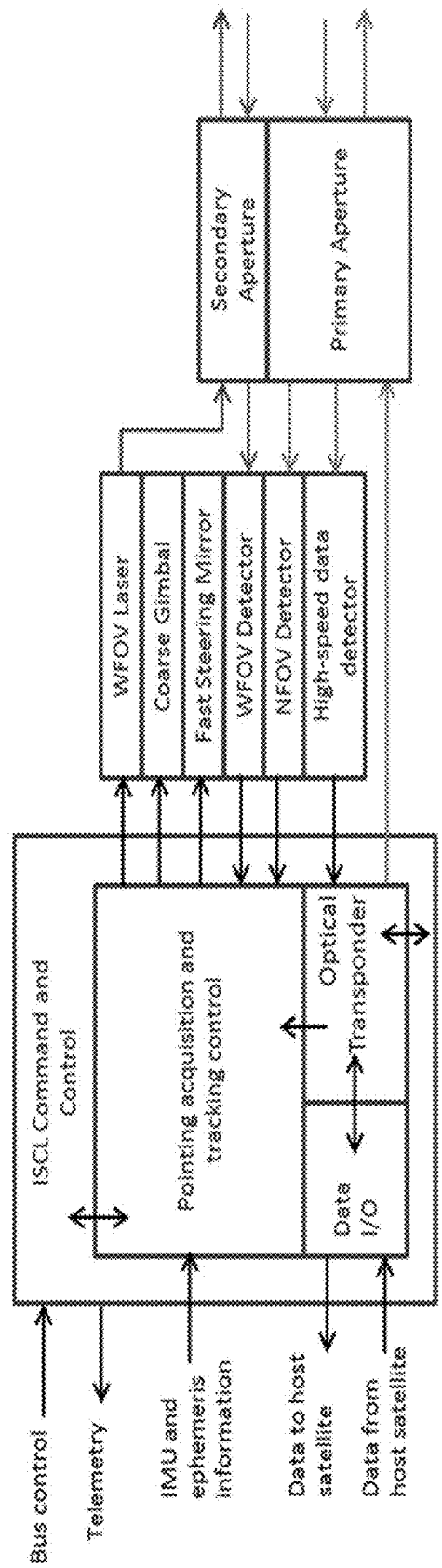
FIG. 9 is a block diagram showing an overall system architecture of an example device.

FIG. 9 is a block diagram showing an overall system architecture of an example device. Both the data and the signaling beacon can be generated from the same 850/830 nm source. To achieve sufficient Tx/Rx isolation in the common aperture, the optical modules can transmit and receive at different wavelengths. For initial acquisition of the link, the transmit signal can be defocused to increase the beam divergence and decrease the link acquisition time. During data transmission, the beam can be focused to increase the received power and data rate. The received signal can be broken into two optical paths using an optical beam splitter; one path can provide data reception using a high-speed APD, while the second path can provide precision pointing and tracking information via a position-sensitive, quadrant detector.

For a single transmit laser to provide both data and signaling, two separate modulation schemes can be used simultaneously. Data can be transmitted via a high-speed, NRZ-OOK modulation, while the beacon will be provided by an additional slow, small-signal modulation. PAT information can be acquired through synchronous detection of this small-signal modulation. Payload data acquisition can utilize a limiting amplifier to digitize the high-speed data without the need for an ADC reducing the total power draw of the electronics. This approach provides robust pointing and tracking, and high-speed data acquisition in a single aperture telescope greatly reducing system weight and power to meet the program goals.

A single FPGA can provide full system control including communication to the host satellite, PAT control, data framing, FEC, Tx, and Rx.

Detailed subsystem descriptions and break-downs are provided in the following sections.

The optical source (e.g., laser) can be directly modulated. The optical source can comprise two polarization multiplexed and directly modulated Fabry-Perot laser diodes. The laser diodes can have of wavelength of either 830 nm or 850 nm. Polarization multiplexing provides system redundancy in that if a single laser fails the system can continue to operate with near full functionality. The output light can be on-off key modulated, with an additional small-signal modulation for PAT via direct modulation. During the acquisition phase when no data are present, the beacon will utilize a large-signal modulation to improve detection SNR.

The photodetector can comprise silicon avalanche photodiode (APD). The photodetector can be temperature stabilized to 300 K using a TEC. The signal from the APD can be first amplified in a transimpedance amplifier with gain control. The amplified signal can be passed through a limiting amplifier with adjustable threshold to make the 1/0 bit decision (e.g., removing the need for an ADC). Additionally, the receiver bandwidth can be configured below the data rate to optimize BER based on receiver noise and inter-symbol interference.

Pointing, Acquisition, and Tracking (PAT) is described as follows. Pointing, Acquisition, and Tracking (PAT) are important functions to closing the data link. The PAT system at a high level can have two operating modes: the acquisition mode (e.g., where the two ends of the links scan to make a connection) and the comm mode (e.g., data communication mode, where the systems maintain the link with minimal power fluctuation). The PAT system can comprise a gimbal that provides coarse beam steering over the required field of regard. The PAT system can comprise a fast steering mirror that provides fine pointing accuracy and fast pointing changes. The PAT system can comprise a second fast steering mirror that offsets the pointing of the transmit beam relative to the receive direction to compensate for the relative motion of the two satellites and also to rapidly scan the transmit beam in acquisition mode. The PAT system can comprise a spatial detector, such as a quad detector (e.g., quad PIN Si detector), configured to sense the pointing direction that feeds back to the fast steering mirror and gimbal. The spatial detector can have a total field of view of 2 mrad. A single transmit beam can be used to provide both data communication and pointing tracking. The signal delivered to the spatial detector can be derived from a 20% tap off the signal delivered to the APD.

To initially acquire the adjacent satellite, a wide-field-of-view (WFOV) acquisition mode can be used to establish the correct pointing vector. This can be done using the same NFOV optics and emulating a WFOV beam through fast scanning of the MEMs mirrors. In addition, the laser collimating lens can be translated to increase the diffraction limited divergence to 67 μrad and the laser can be modulated at ~5 KHz. In the acquisition mode, data communication can be disabled. In the acquisition mode the full laser power can be utilized for PAT (e.g., increasing the average received power by 4 dB). The acquisition method described assumes that there is no communication between the satellites; with some communication, faster acquisition schemes could be enabled.

The relative motion of the two satellites together with the small beam divergence at IR wavelengths suggests that the pointing vector of the transmit beam should be offset from the pointing vector of the receive beam. The transmitter can look ahead of the receiver. This pointing difference can be on the order of 900 μrad at the worst case at 4000 km. It can be assumed that the expanded beam angle of the WFOV is larger than the uncertainty in the look-ahead provided from ephemeris data. The look-ahead angle can be optimized by imposing a small nutation on the transmit beam which can be detected on the opposite side of the link. This pointing-error data can be relayed between the two satellites by varying the modulation frequency of the beacon synchronously with the nutation which can be processed to optimize the pointing offset. This optimization can be implemented just before the WFOV beam is narrowed for communications. During data communications the supervisory channel can provide the necessary feedback to allow closed-loop operation of the look-ahead mirrors.

When commanded to establish a link, first the ephemeris data can be analyzed to provide coarse pointing. As an initial estimate, it can be assumed that there is a high probability of finding the target within a field of regard (FOR) equal to a +/−3 mrad cone around the pointing direction given by the ephemeris data. Next the laser steering mirror can be continuously scanned over the quad detector field of view (QFOV) which is +/−1 mrad and offset by the 'look ahead' angle. The time to perform a single scan can be 0.44 s and can be set by the time the spot must be on target to achieve a threshold SNR level. Simultaneously, the QFOV can be scanned slowly over the FOR. In the simplest implementation, the two satellites would perform spiral scans over the FOR at different rates, the ratio of the rate being equal to that of the QFOV solid angle to FOR solid angle. The two scan times with this implementation are 5.6 s and 72 s, with some margin added for overlap within a scan. The worst case acquisition time can be the 72 s time. More complex scanning algorithms can be envisioned to improve the locking time. Digital signaling can be provided between the satellites by shifting the modulation frequency. A transmitter can shift its modulation frequency when the transmitter detects and locks to the received beacon. The link can transition to the operating mode when it is both receiving and transmitting the shifted frequency. The transition can comprise a controlled reduction in the laser scan range followed by the addition of data modulation. This can be followed by bringing up the data link, timing, framing, FEC, etc. During standby no power can be required and the devices are completely deactivated. Weight contributions from these components can be included in the electronic PCBs and telescope.

Figure 10:
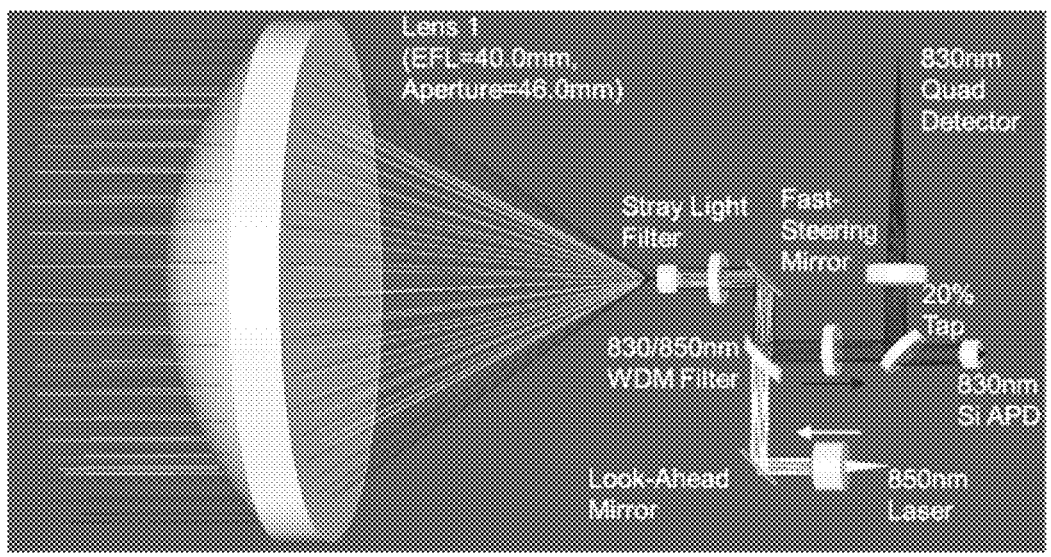
FIG. 10 is a diagram showing a simulation of operation of an optical terminal.
Figure 11:
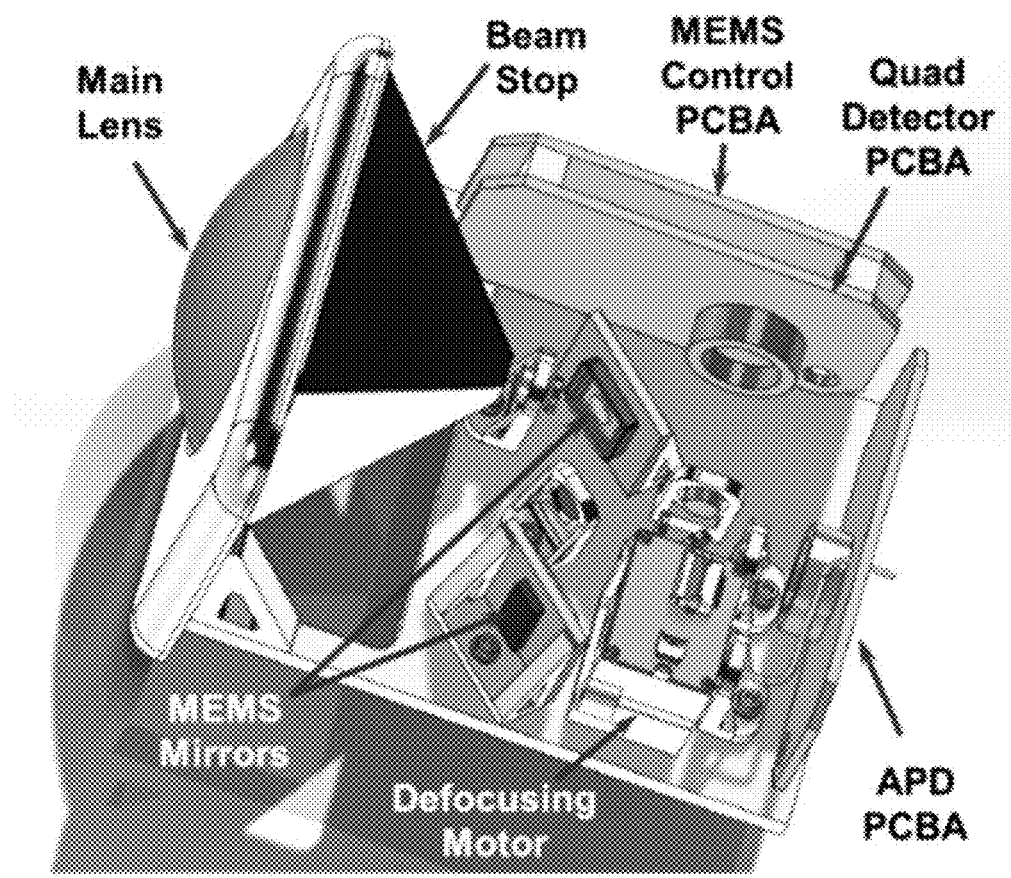
FIG. 11 is diagram showing an example terminal in accordance with the present disclosure.

An example telescope (e.g., or terminal) is described as follows. The telescope can comprise a light-weight, multi-function telescope to perform satellite acquisition, tracking and data communications. This telescope architecture can be seen in FIG. 4, and a full optical simulation of the system is shown in FIG. 10 showing that the full operation can be supported within a compact optical payload. In FIG. 10, the receive path is shown in dark lines, transmit path in white lines. The telescope can comprise an opto-mechanical design shown in FIG. 11. The telescope can have a compact refracting configuration which has a primary aspheric lens of 46 mm diameter and a focal length of 40 mm. The secondary lens can have a focal length of 1.8 mm giving the telescope a magnification of 22× and collimated beam diameter of 2 mm within the optics system. This high magnification and narrow collimated beam size allow for utilizing light-weight, high-speed MEMS mirrors for both fast-steering and look-ahead pointing, reducing the total telescope weight.

The telescope can perform simultaneous transmit and receive by wavelength multiplexing transmit and receive beams at 850 and 830 nm. During communications, the laser source can be launched from an optical fiber and collimated into a diffraction limited beam. The diffraction limited beam can have a beam divergence of 15 μrad (e.g., with an expected actual beam divergence of 27 μrad due to non-ideal optics). A first MEMS mirror can provide look-ahead capabilities to account for the offset between the transmit and receive directions required by the relative motion of the satellites and the time of flight of light. A second MEMS mirror can be configured as a fast-steering mirror to remove high-speed jitter due to platform vibrations and provide the required precision pointing. During initial acquisition of the adjacent satellite, a lens translator can be used to defocus the transmitted laser light providing a wider transmit beam divergence and reducing the time to acquisition.

After the primary telescope, a band-pass filter can be used to reduce background star and planet light that enters the optical path. The receive path can be separated from the transmit path using a dichroic filter. A second transmit/receive filter can be used to provide additional isolation between the received signal and any back reflected transmit light. The received beam can be split with a beam splitter. 20% of the received signal can be directed onto a quad position sensing detector for alignment to the adjacent satellite. 80% of the received beam can be focused onto a high-speed Si APD for data reception.

One key challenge of the telescope's opto-mechanical design is mounting the optics rigidly enough that they maintain alignment during launch, and over the mission lifetime while keeping the total telescope weight low. All parts in the telescope can be hard mounted to the optical platform and designed to withstand launch conditions. Lens and optical mounts can be designed to allow adjustment for ease of assembly and to securely hold that adjustment during launch and deployment. Considerations can be made to provide a thermally and mechanically stable optical platform by specifying controlled thermal expansion materials where necessary, while using lightweight parts and construction techniques to stay within the weight budget. The lens translation stage and MEMS mirrors can provide multiple methods of re-aligning the optical train after launch if necessary. MEMS steering mirrors can be chosen for their low mass compared to other electromagnetic and piezoelectric solutions with similar pointing accuracies and control bandwidths.

Figure 12:
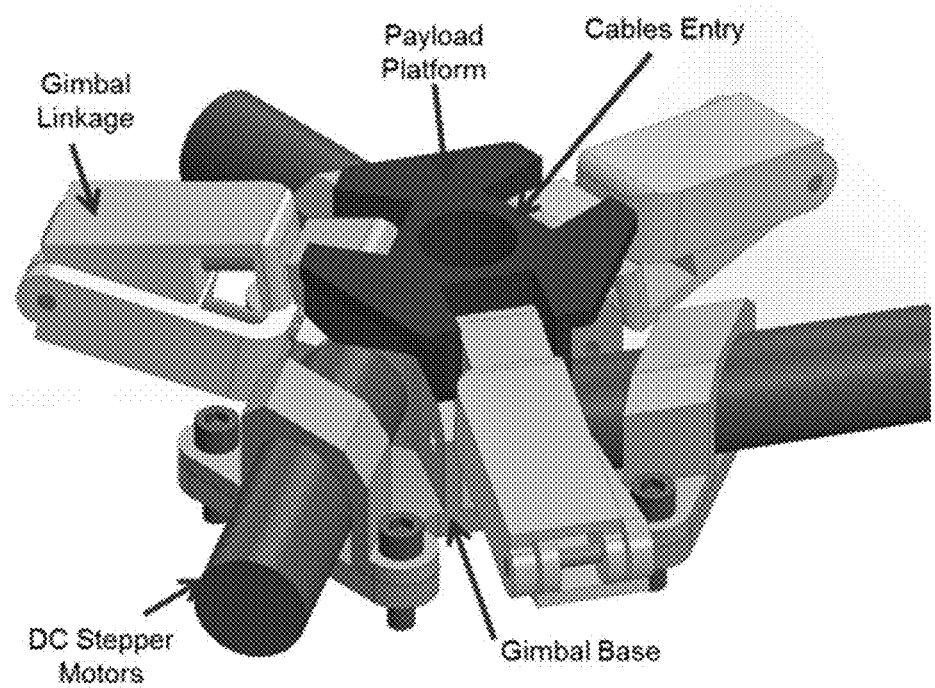
FIG. 12 is a diagram showing an example coarse pointing device.

An example coarse pointing device, such as a gimbal is described as follows. FIG. 12 shows a mechanical model of a gimbal in the stowed position. The gimbal can comprise the COBRA gimbal produced by Tethers Unlimited. The gimbal can comprise continuous, full-hemispherical coverage with a pointing accuracy of better than 300 μrad. The gimbal can have a mass of only 170 g including actuators and fits in a standard cubesat footprint of 10×10 $cm^2$. The gimbal can have a large holding torque such that it is rigidly held in place with no power, and a center through hole to allow cables to be routed to the payload without catching over the total field-of-view. Tethers can be used to customize the gimbal to reduce the overall power draw from 1.5 to 0.5 W. This can be done by reducing the maximum slew rate from 120°/s to 6°/s reducing the power required for the drive motors. During launch, a burn wire can constrain the gimbal in the axial direction (perpendicular to the motors) and the base and distal ends of the gimbal would have a cup-cone interface for lateral support. Deployment can be initiated by a non-explosive actuator (NEA). The gimbal's actuators can provide low mechanical noise performance due to their ability to microstep and coupling to a planetary gearhead. Thus, minimal jitter should be imparted to the host satellite. However, if lower noise is necessary for long-exposure images, the mechanical gimbal can be completely disabled, and PAT can be performed exclusively using the fast-steering mirror for several seconds.

While the COBRA gimbal provides a mature baseline solution, the per unit cost may make it prohibitively expensive for a low cost solution deployable on a wide range of platforms. For this reason, low-power, 3-D stabilized quadcopter gimbals, can be used. These gimbals are widely available with prices <$200 per unit and provide the specified slew and pointing accuracy in a light weight form factor, but are not designed for space environments. We will procure a sample, examine its space worthiness, and engineer mechanical and electrical customizations to optimize it for space flight, with a focus on reducing their total power draw which is typically several Watts.

Example processing, Controls, and Power Electronics are described as follows. The electronics can be divided into two physical enclosures—the telescope and the base. The structure of the electrical subassemblies (PCBs) can be driven by the configuration of the optical systems, the mechanical design, and the optimization of electrical interconnects for signal integrity. The control electronics along with power conditioning and drive circuitry can be housed in the base unit on two boards referred to as the main controller and the power/driver boards. The main control board can comprise an FPGA and/or support devices, such as clocks, memory, and power. The firmware can reside on the main control board in the FPGA and can be responsible all control functions and communications. The power/driver board can provide system power conditioning, source lasers and their associated drive electronics, and/or the gimbal drive electronics. The remaining PCBs can be disposed in the telescope (e.g., terminal) and provide drive circuitry for MEMS and electro-optic devices that reside there. The main control board can monitor and/or drive the telescope electronics through a wire harness connecting the base and telescope. There can be one or more (e.g., four) small active circuit boards in the telescope. The telescope boards perform optical to electrical conversion at the photo diodes along with driving the MEMS steering mirrors and the FOV actuator.

Example FPGA platforms that can be used are listed in Table 1, with flight heritage or a reasonable path to flight. The FPGA will serve as the singular control device for all electro-optic and electrical systems. A highly integrated FPGA technology can be used along with available commercial IP, such as forward error correction (FEC). This strategy also provides a simpler path to an ASIC to further improve power and weight contributions for larger scale deployments in commercial and government markets.

TABLE 1

| Vendor | Family | Part |
|---|---|---|
| Xilinx | Zynq | XC7Z020 |
| Altera | Aria V | 5AGTFC7H |
| Xilinx | Spartan | XC6SLX75 |
| Microsemi | SmartFusion2 | M2S050T |

The PAT electronics can be distributed throughout the electronics across multiple circuit boards with firmware residing on the main control board. The PAT electronics and software can be configured to control both coarse and fine pointing. Two interacting control loops with multiple control points can be used for the coarse and/or fine pointing. The FPGA can generate waveforms for modulation over the transmit lasers for each control loop. The DSP within the FPGA will read the quad detector ADC and perform numerical conversion, scaling, and filtering of the received signal. The internal algorithm can interpret this input along with ephemeris data from the host satellite and drive the pointing hardware to converge on a lock with the target satellite. The firmware can transition from a standby phase, to an acquisition phase, and then to the data transfer phase. The acquisition phase (e.g., operational mode) can comprise a coarse pointing phase that uses the gimbal and steering mirrors to align to the transmitted beacon in the wide FOV. Once acquisition is complete, the fine steering mirror can be further used to track the narrow FOV beacon. The electronics can be configured for maintaining these phases and performing power reduction by turning off and/or limiting power to systems not in use during each phase. Additional techniques will be employed within the FPGA to further reduce power such as clock gating.

The data path for the system can flow between the FPGA and the payload-data bus and between the FPGA and the transmit/receive optics. Optical Transport Network (OTN) protocol can be used. OTN provides a framing structure and FEC option along with payload allocation that supports Ethernet along with standard telecom protocols as well. The OTN protocol supports general FEC (GFEC) that imposes a 7% overhead. The OTN solution is available from FPGA vendors and third parties as a logic core. The payload interface may not defined in the BAA. OTN's OPU can be used. However, the selection of the physical layer and upper layer protocols can have an impact on power consumption. In addition to these functions the data path processor can be configured to negotiate the highest possible link rate based on received signal strength. The system can also provide telemetry such as link rate, statistics, and FEC data as power budgets allow. While OTN rates are significantly higher than those that will be used, the framing, FEC, overhead and other functions defined in OTN can be utilized by running the data clock at an appropriate rate.

Link negotiation can begin at the lowest supported rate and increase to a rate that exceeds acceptable threshold and back-off to previous rate. This threshold can be determined in cooperation with the customer system engineer once the contract has been executed. The pre-FEC rates used for the purpose of this proposal can comprise 70 Mbps, 225 Mbps, 450 Mbps, and 640 Mbps. The number of rate selection can be limited to four to reduce complexity; however, the rates themselves can be adjusted to fit a particular network architecture and satellite node configuration.

The control plane can comprise a processor, an interface to the platform, and/or all of the measurement points available in the electronics. The electronics will provide telemetry to the platform that includes customer specified measurements and statistics. The control plane will also allow the platform to provide ephemeris and IMU data to the electronics. The firmware can be updated through the payload interface allowing for field enhancements.

Figure 13:
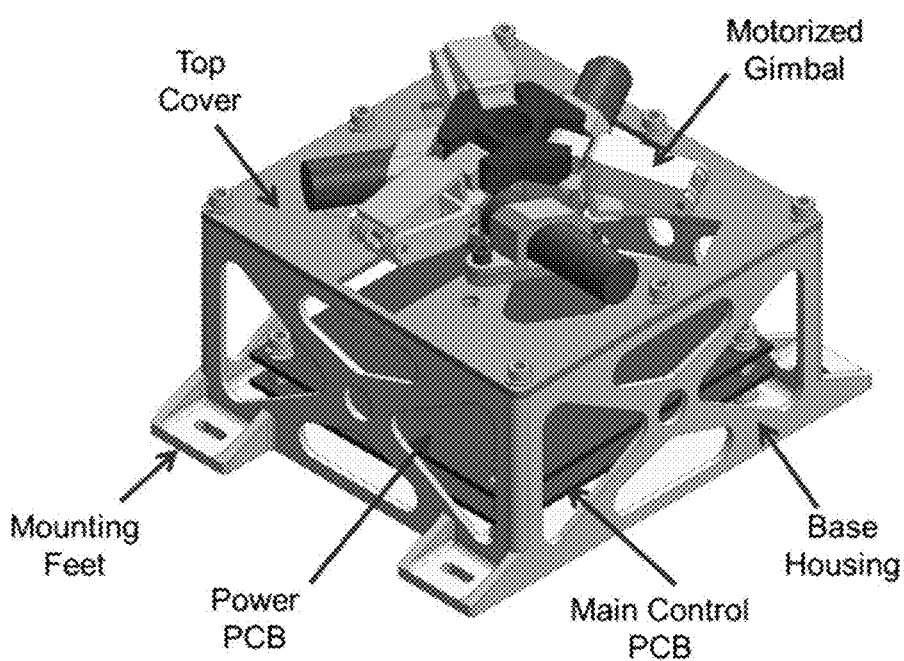
FIG. 13 is a diagram showing an example base and coarse pointing device.

Example Packaging and Assembly are described as follows. The disclosed device can comprise two major subassemblies: 1) the main electronics enclosure assembly which provides the housing for the main controller and power boards of the system and also provides the mounting and support for the motorized Cobra™ Gimbal, and 2) the optical telescope which houses the optical lenses, MEMS mirrors, filters and related components for pointing acquisition and tracking control. Connecting the two subassemblies can be the motorized gimbal. Aluminum alloy with chemical conversion coating as per MIL-DTL-5541 can be used to construct the main electronics enclosure. Material will be machined out from the base and top cover to reduce overall weight of enclosure assembly. The preliminary enclosure concept is shown in FIG. 13.

The base housing can be machined from a single piece of aluminum to provide maximum mechanical strength. The base housing can include mounting feet for secure fastening to the host satellite. It can have four bosses to provide mounting for the PCB assemblies. Appropriate standoffs height will be used to stack up multiple PCB assemblies which will be secured using machine screws. Thermal interface pads can be placed under the high heat dissipating components of PCB to sink heat to the metal body of enclosure. The top plate can provide mounting holes for the motorized Cobra™ gimbal assembly. The power and I/O signal connectors can be placed on one side of the enclosure to bring the power in from the host satellite. The enclosure can be enveloped in space-qualified multi-layer insulation (MLI) to provide temperature stabilization. The MLI can provide protection from micro-meteorites and a common grounding plane to prevent arcing. MLI can be sufficient protection from micro-meteorites and other debris. Based on data provided by the ESA's post-flight analysis of Eureca only two impact events of significance are expected, neither of which is likely to completely penetrate the MLI.

SWaP Related Issues. The disclosed techniques can be used to implement a device that would be a very compact, low weight, low-power consuming optical communications terminal, capable of bi-directional high-speed communications. Such a device would have obvious benefits for spaced-based communications networks, where payload size, mass and power efficiency are of prime importance.

The device may be used to implement a space-based communication network. The communication network may comprise a plurality of space objects, such as satellites, space stations, space ships, and/or the like. The communication network can comprise a satellite constellation network. The communication network can comprise a mesh network. The communication network can be configured to provide a global network for connecting to the internet via communications between the ground and space objects. In comparison to conventional devices, using the disclosed techniques allows for a much smaller, cheaper terminals. Furthermore, for true mesh network inter-connectivity, the space objects may be required to have at least 4 or 5 communications terminals on a single satellite, making the SWaP per terminal an even bigger concern.

Weight issues. An example optical communications terminal can comprise (e.g., or consist of) three parts: the optical telescope, the coarse pointing gimbal, and the control electronics. The disclosed techniques can be used to improving the implementation of a small, compact, efficient telescope. If one has a small compact efficient telescope, it becomes possible to combine this with a small, compact, efficient Gimbal, to achieve all the desired functionality required of an optical communications terminal. Use of such a small, compact, efficient Gimbal would not work for larger telescopes.

Using the disclosed techniques (e.g., which may be implemented in COTS hardware) it is possible to build a fully functioning telescope that weighs entirely less than about 1 pound. A compact, coarse pointing COTS gimbal may be used to meet pointing requirements, when using a telescope that weighs less than 1 lb. Such gimbal may weigh less than about 0.4 lbs. The base electronics which controls all aspects of Link Performance, acquisition, Tracking and Data Link creation, maintenance can be implemented with electronics boards that weigh less than about 0.75 lb. Thus, a fully functioning optical terminal can be made that can provide the necessary function for implementing high-speed laser communications, and still weigh entirely less than about 2.5 pounds.

Power Consumption Issues. The on-orbit electrical power consumption is another important performance metric that distinguishes the disclosed techniques from convention devices. That is, the ability to perform all necessary link Acquisition, Tracking and Data Link functions with minimal electrical power consumption.

With any optical communications link, there can be different modes of operation: Standby Mode: No Acquisition or Data Transfer occurring, minimum power consumed required for "life support"; Acquired Mode: Terminal is actively searching for its companion terminal, notably the Gimbal is being fully exercised in this search mode; Data Transfer Mode: Link has been Acquired and data transfer has begun. The orbit-average electrical power consumption for an example COTS implemented optical communications terminal can be expected to be less than about 3.5 watts.

Figure 14A:
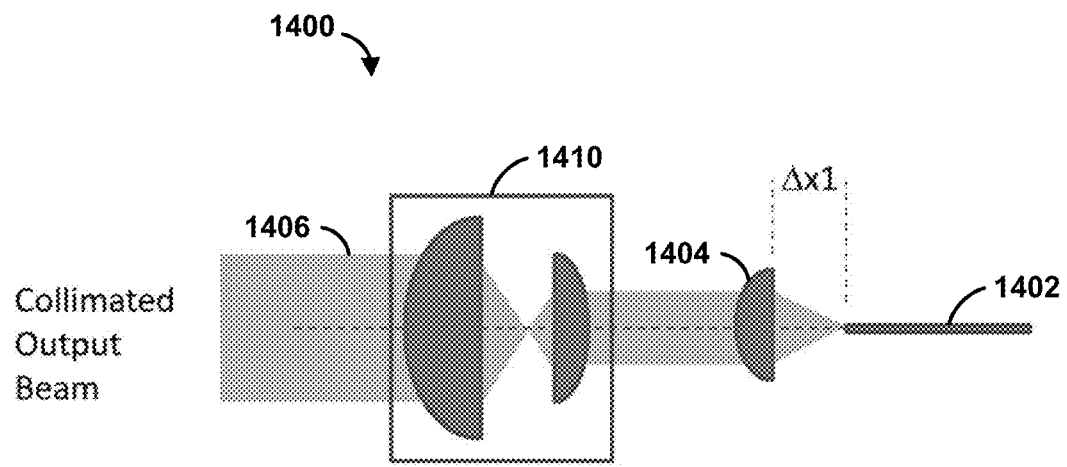
FIG. 14A shows an example defocuser adjusted for a first beam divergence.
Figure 14B:
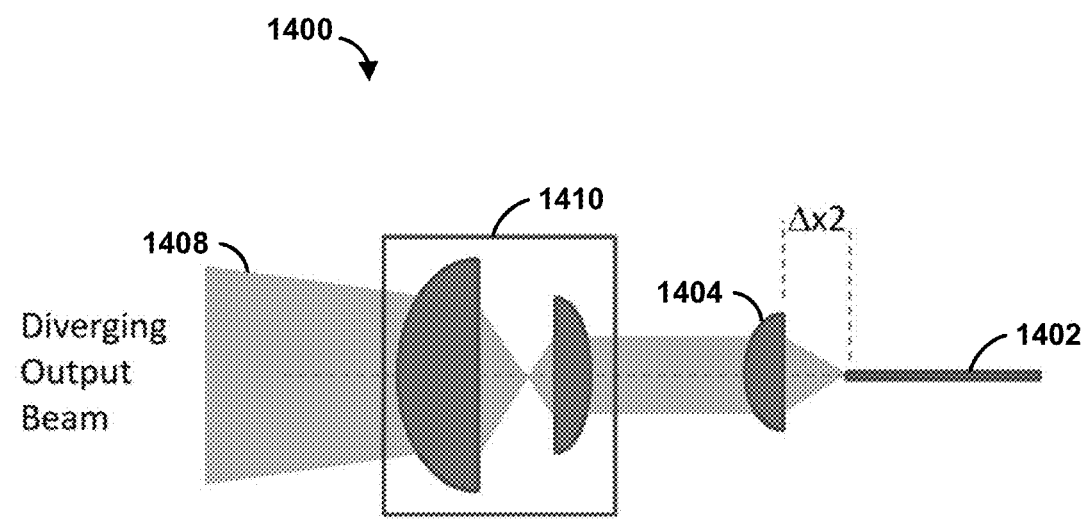
FIG. 14B shows an example defocuser adjusted for a second beam divergence.

FIGS. 14A-B show an example defocuser 1400 adjusted for different beam divergences. The defocuser 1400 can be configured to receive an optical signal. The defocuser 1400 can comprise the defocuser 402 of FIG. 4. The optical signal can be received from a laser. The laser can transmit the optical signal to the defocuser 1400 via a fiber 1402. The fiber 1402 can output the optical signal as a free space optical signal. The defocuser 1400 can be configured to control a beam divergence of the optical signal. The optical signal can comprise a data signal, a beacon signal, or a combination thereof. A controller can be configured to cause the defocuser 1400 to adjust the beam divergence based on an operational mode of the laser. The defocuser 1400 can enable use of the laser and output optics for both a communication mode and one or more of a tracking mode or a link acquisition mode. The output optics can comprise the one or more steering mirrors 404, the first filter 406, the second filter 408, the optical interface 410, or a combination thereof.

The defocuser 1400 can comprise an adjustable lens 1404 configured to control the beam divergence. The defocuser 1400 can be configured to control the beam divergence by adjusting a distance between the adjustable lens and a source of the optical signal (e.g., or another lens, such as a lens at the output of the fiber 402, or a lens of the beam expander 1410). The controller can be configured to cause the defocuser 1400 to adjust the beam divergence to a first beam divergence 1406. FIG. 14A shows an example defocuser 1400 adjusted for a first beam divergence. The first beam divergence can result in a substantially collimated beam. The first beam divergence 1406 can be for (e.g., or associated with) a first operational mode. The controller can be configured to adjust the beam divergence to have a second beam divergence. The second beam divergence can be for (e.g., or associated with) a second operational mode. FIG. 14B shows an example defocuser 1400 adjusted for a second beam divergence. The second beam divergence can be larger (e.g., wider) than the first beam divergence. The first operational mode can comprise a data communication mode. The second operational mode comprise one or more of a tracking mode or a link acquisition mode.

The defocuser 1400 can modify an optical signal to have the first beam divergence by adjusting the defocuser 1400 to the first setting. The first setting can comprise a position, location, shape, combination, and/or the like of one or more lenses. Adjusting the defocuser 1400 to the first setting can comprise adjusting a distance between the adjustable lens 1404 and a source of the optical signal to a first distance (e.g., $\Delta \times 1$).

The defocuser 1400 can modify an optical signal to have the second beam divergence by adjusting the defocuser 1400 to the second setting. The second setting can comprise a position, location, shape, combination, and/or the like of one or more lenses. Adjusting the defocuser 1400 to the second setting can comprise adjusting a distance between the adjustable lens 1404 and a source of the optical signal to a second distance (e.g., $\Delta \times 2$).

The defocuser 1400 can comprise a beam expander 1410. The beam expander can be configured to increase the size of a beam comprising the optical signal. The beam expander 1410 can be configured to receive the optical signal from the adjustable lens 1404. The beam expander 1410 can comprise one or more lenses configured to increase a size of the optical signal. The beam expander 1410 can be configured to output the optical signal with the first beam divergence and/or the second beam divergence (e.g., and any other beam divergence)

Figure 15:
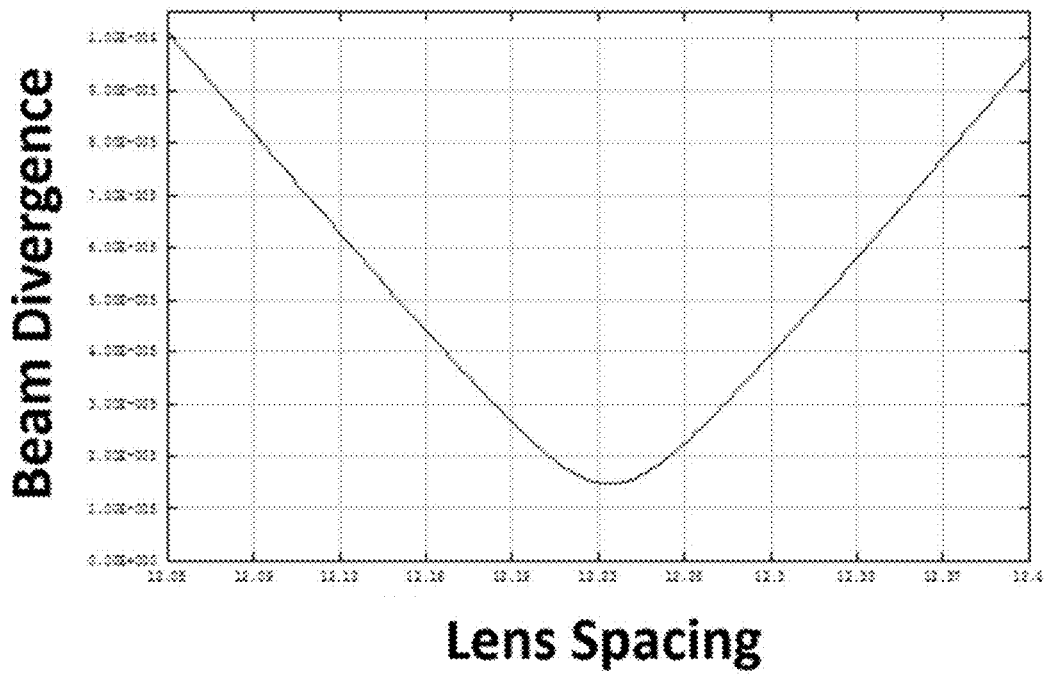
FIG. 15 is a graph showing beam divergence and lens spacing for an example defocuser.

FIG. 15 is a graph showing beam divergence and lens spacing for an example defocuser. The graph shows that small changes in lens spacing can cause sufficient changes in beam divergence to enable multiple operational modes for communication, tracking, and link acquisition.

Figure 16A:
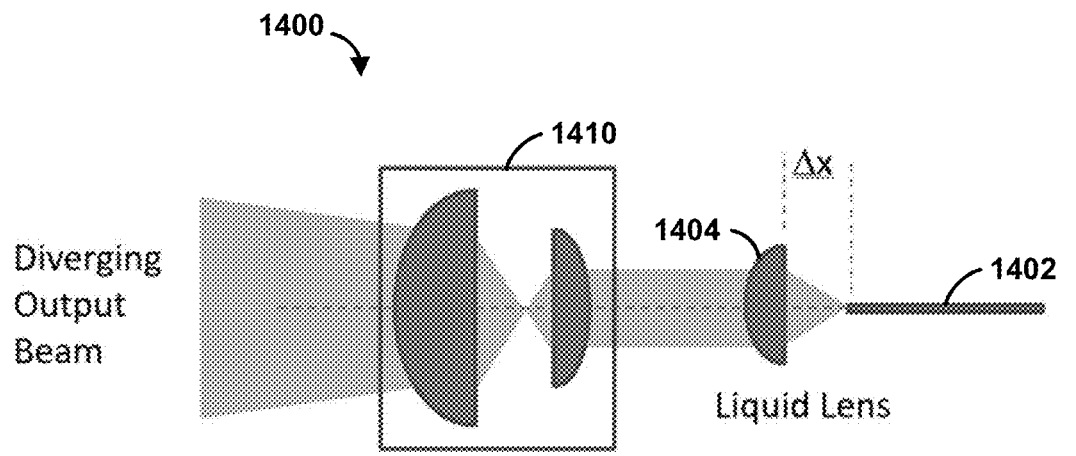
FIG. 16A shows another example defocuser.
Figure 16B:
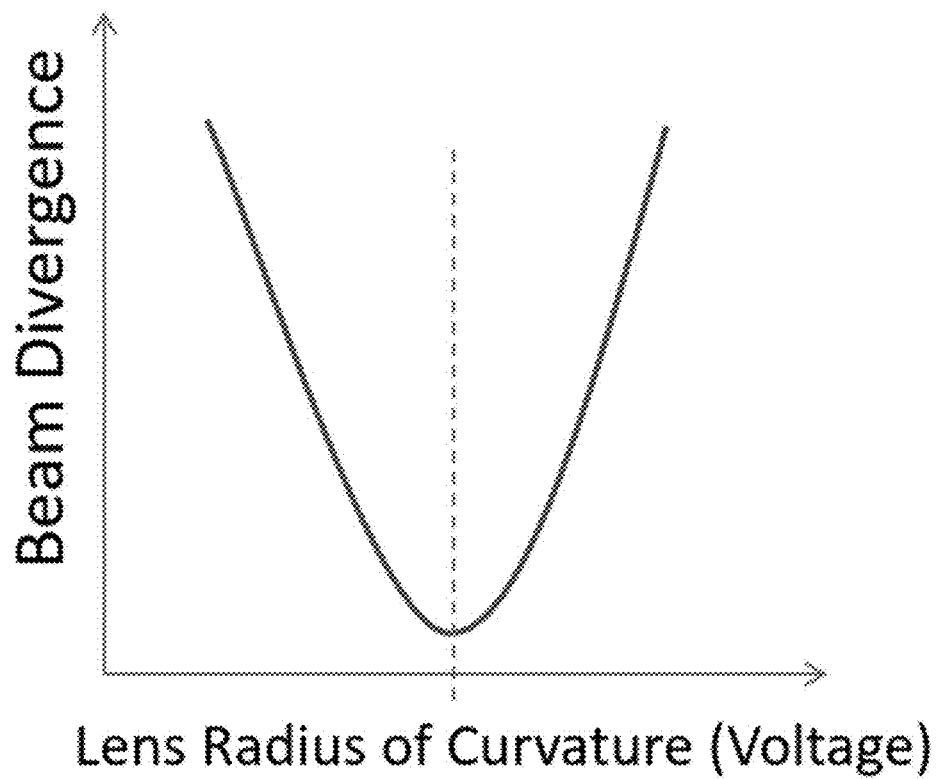
FIG. 16B shows a graph illustrating how the lens radius of curvature can be varied based on different voltages to achieve different beam divergence results.

FIG. 16A shows another example defocuser 1400. The adjustable lens 1404 of the defocuser 1400 can comprise a liquid lens configured to change shape to modify the beam divergence. The shape (e.g., and beam divergence) can be changed in response to an electrical signal (e.g., applied to the liquid lens), such as a voltage signal. Changing the shape can comprise changing a radius of curvature of the liquid lens. FIG. 16B shows a graph illustrating how the lens radius of curvature can be varied based on different voltages to achieve different beam divergence results.

The defocuser described herein can be used to enable a system for free space optical communication. The system can comprise a first optical terminal. The system can comprise a second optical terminal. The second optical terminal can be configured to communicate with the first optical terminal. One or more of the first optical terminal or the second optical terminal can comprise the defocuser as described herein. The first optical terminal can be disposed on a space object (e.g., satellite, space shuttle, space station, moon or planet base). The second optical terminal can be disposed on a second space object. The first space object and the second space object can be part of a mesh network, constellation network, low earth orbit network, a combination thereof, and/or the like.

Figure 17:
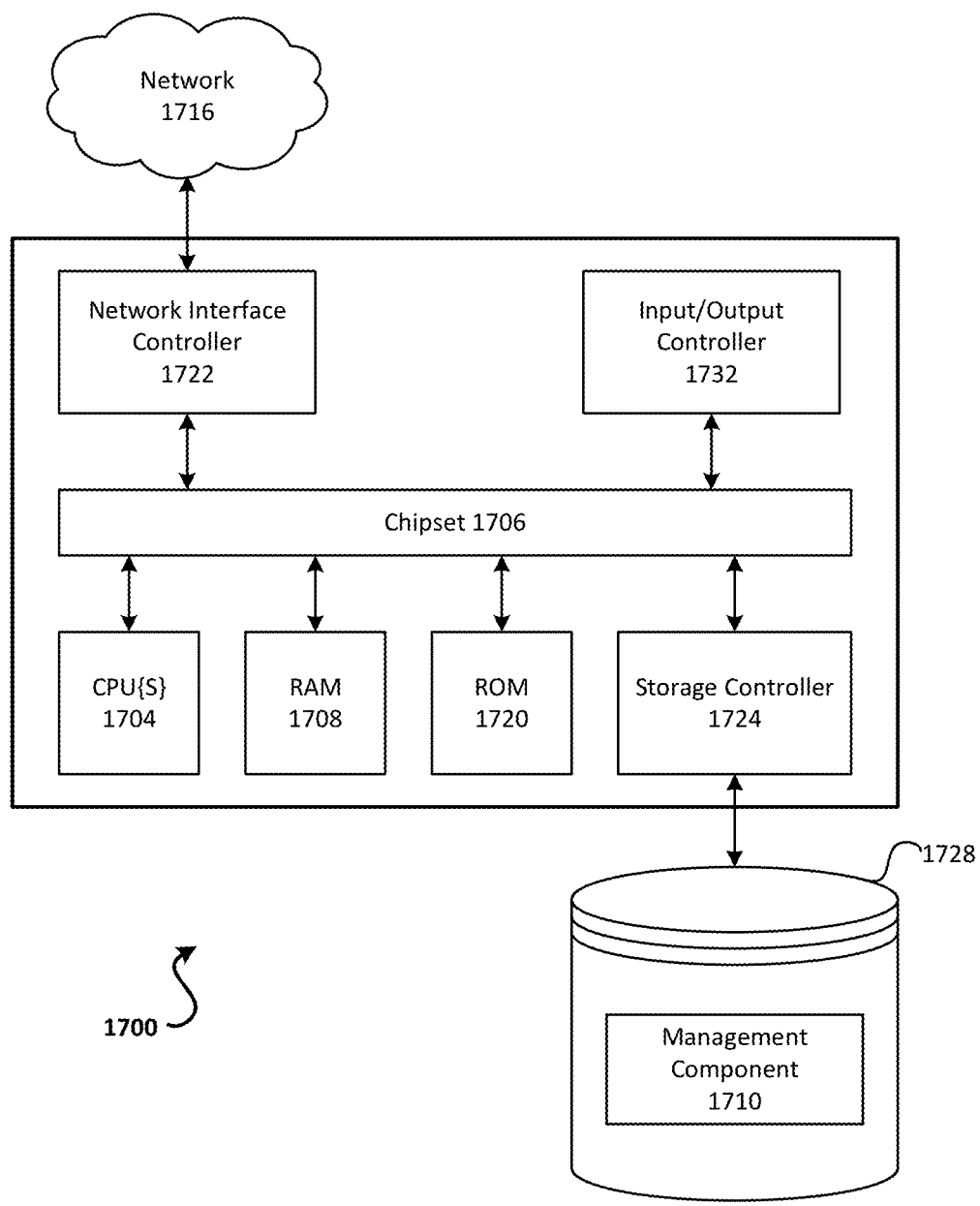
FIG. 17 is a block diagram illustrating an example computing device.

FIG. 17 depicts a computing device that may be used in various aspects, such as the one or more controllers described herein may each be implemented in an instance of a computing device 1700 of FIG. 17. The computer architecture shown in FIG. 17 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1700 may include a baseboard, or "motherboard," which is a printed circuit board to which a multitude of components or devices may be connected by way of a system bus or other electrical communication paths. One or more central processing units (CPUs) 1704 may operate in conjunction with a chipset 1706. The CPU(s) 1704 may be standard programmable processors that perform arithmetic and logical operations necessary for the operation of the computing device 1700.

The CPU(s) 1704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1704 may be augmented with or replaced by other processing units, such as GPU(s) 1705. The GPU(s) 1705 may comprise processing units specialized for but not necessarily limited to highly parallel computations, such as graphics and other visualization-related processing.

A chipset 1706 may provide an interface between the CPU(s) 1704 and the remainder of the components and devices on the baseboard. The chipset 1706 may provide an interface to a random access memory (RAM) 1708 used as the main memory in the computing device 1700. The chipset 1706 may further provide an interface to a computer-readable storage medium, such as a read-only memory (ROM) 1720 or non-volatile RAM (NVRAM) (not shown), for storing basic routines that may help to start up the computing device 1700 and to transfer information between the various components and devices. ROM 1720 or NVRAM may also store other software components necessary for the operation of the computing device 1700 in accordance with the aspects described herein.

The computing device 1700 may operate in a networked environment using logical connections to remote computing nodes and computer systems through local area network (LAN) 1716. The chipset 1706 may include functionality for providing network connectivity through a network interface controller (NIC) 1722, such as a gigabit Ethernet adapter. A NIC 1722 may be capable of connecting the computing device 1700 to other computing nodes over a network 1716. It should be appreciated that multiple NICs 1722 may be present in the computing device 1700, connecting the computing device to other types of networks and remote computer systems. For example, the device 100 of FIG. 1 can be part of a space object (e.g., satellite). The space object can be part of a constellation network (e.g., or a space mesh network), such as a network of space objects (e.g., orbiting around earth or other space object). The space object can comprise several devices 100, such as about 3 to about 5 devices (e.g., configuring communication to multiple different objects in the constellation network).

The computing device 1700 may be connected to a mass storage device 1728 that provides non-volatile storage for the computer. The mass storage device 1728 may store system programs, application programs, other program modules, and data, which have been described in greater detail herein. The mass storage device 1728 may be connected to the computing device 1700 through a storage controller 1724 connected to the chipset 1706. The mass storage device 1728 may consist of one or more physical storage units. A storage controller 1724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1700 may store data on a mass storage device 1728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1728 is characterized as primary or secondary storage and the like.

For example, the computing device 1700 may store information to the mass storage device 1728 by issuing instructions through a storage controller 1724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1700 may further read information from the mass storage device 1728 by detecting the physical states or characteristics of one or more particular locations within the physical storage units.

In addition to the mass storage device 1728 described above, the computing device 500 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1728 depicted in FIG. 17, may store an operating system utilized to control the operation of the computing device 1700. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1728 may store other system or application programs and data utilized by the computing device 1700.

The mass storage device 1728 or other computer-readable storage media may also be encoded with computer-executable instructions, which, when loaded into the computing device 1700, transforms the computing device from a general-purpose computing system into a special-purpose computer capable of implementing the aspects described herein. These computer-executable instructions transform the computing device 1700 by specifying how the CPU(s) 1704 transition between states, as described above. The computing device 1700 may have access to computer-readable storage media storing computer-executable instructions, which, when executed by the computing device 1700, may perform the methods described herein.

A computing device, such as the computing device 1700 depicted in FIG. 17, may also include an input/output controller 1732 for receiving and processing input from a number of input devices, such as a keyboard, a mouse, a touchpad, a touch screen, an electronic stylus, or other type of input device. Similarly, an input/output controller 1732 may provide output to a display, such as a computer monitor, a flat-panel display, a digital projector, a printer, a plotter, or other type of output device. It will be appreciated that the computing device 1700 may not include all of the components shown in FIG. 17, may include other components that are not explicitly shown in FIG. 17, or may utilize an architecture completely different than that shown in FIG. 17.

As described herein, a computing device may be a physical computing device, such as the computing device 1700 of FIG. 17. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A device for free space optical communication comprising:
   a defocuser configured to receive an optical signal from a laser and control a beam divergence of the optical signal, wherein the optical signal comprises a data signal and a beacon signal; and
   a controller configured to cause the defocuser to adjust the beam divergence to a first beam divergence for a first operational mode and a second beam divergence for a second operational mode, wherein the first operational mode comprises a communication mode and the second operational mode comprises one or more of a tracking mode or a link acquisition mode, and wherein a single aperture is used for the first operational mode and the second operational mode, and wherein the single aperture is used for both transmission of the optical signal into free space and receiving optical signals from one or more communication devices via free space.

2. The device of claim 1, wherein the defocuser comprises an adjustable lens configured to control the beam divergence.

3. The device of claim 2, wherein the adjustable lens comprises a liquid lens configured to change shape, in response to an electrical signal, to modify the beam divergence.

4. The device of claim 2, wherein the defocuser is configured to control the beam divergence by adjusting a distance between the adjustable lens and a source of the optical signal.

5. The device of claim 1, wherein the second beam divergence is wider than the first beam divergence.

6. The device of claim 1, wherein the defocuser enables use of the laser and output optics for both the communication mode and one or more of the tracking mode or the link acquisition mode.

7. The device of claim 1, wherein the defocuser and the controller are comprised in a satellite.

8. A method for free space optical communication comprising:
   adjusting, based on a first operational mode, a defocuser to a first setting configured for a first beam divergence, wherein the first operational mode comprises a data communication mode;
   receiving, from a laser, a first optical signal;
   modifying, using the defocuser adjusted to the first setting, the first optical signal to have the first beam divergence;
   adjusting, based on a second operational mode, the defocuser to a second setting configured for a second beam divergence, wherein the second operational mode comprise one or more of a tracking mode or a link acquisition mode;
   receiving, from the laser, a second optical signal;
   modifying, using the defocuser adjusted to the second setting, the second optical signal to have the second beam divergence; and
   outputting one or more of the modified first optical signal or the modified second optical signal, wherein a single aperture is used for the first operational mode and the second operational mode, and wherein the single aperture is used for both receiving optical signals from one or more communication devices via free space and transmission to the one or more communication devices via free space of one or more of the modified first optical signal or the modified second optical signal.

9. The method of claim 8, wherein the defocuser comprises an adjustable lens configured to control beam divergence.

10. The method of claim 9, wherein the adjustable lens comprises a liquid lens configured to change shape, in response to an electrical signal, to modify the beam divergence.

11. The method of claim 9, wherein adjusting the defocuser to the first setting comprises adjusting a distance between the adjustable lens and a source of the optical signal to a first distance, and wherein adjusting the defocuser to the second setting comprises adjusting the distance between the adjustable lens and the source of the optical signal to a second distance different than the first distance.

12. The method of claim 8, wherein the second beam divergence is wider than the first beam divergence.

13. The method of claim 8, wherein the defocuser enables use of the laser and output optics for both the communication mode and one or more of the tracking mode or the link acquisition mode.

14. A system for free space optical communication comprising:
- a first optical terminal; and
- a second optical terminal configured to communicate with the first optical terminal, wherein one or more of the first optical terminal or the second optical terminal comprises:
  - a defocuser configured to receive an optical signal from a laser and control a beam divergence of the optical signal, wherein the optical signal comprises a data signal and a beacon signal; and
  - a controller configured to cause the defocuser to adjust the beam divergence to a first beam divergence for a first operational mode and a second beam divergence for a second operational mode, wherein the first operational mode comprises a communication mode and the second operational mode comprises one or more of a tracking mode or a link acquisition mode, wherein a single aperture of the first optical terminal is used for the first operational mode and the second operational mode, and wherein the single aperture is used for both transmission of the optical signal from the first optical terminal and receiving optical signals from the second optical terminal.

15. The system of claim 14, wherein the defocuser comprises an adjustable lens configured to control the beam divergence.

16. The system of claim 15, wherein the adjustable lens comprises a liquid lens configured to change shape, in response to an electrical signal, to modify the beam divergence.

17. The system of claim 15, wherein the defocuser is configured to control the beam divergence by adjusting a distance between the adjustable lens and a source of the optical signal.

18. The system of claim 14, wherein the second beam divergence is wider than the first beam divergence.

\* \* \* \* \*